United States Patent [19]

Goldberg et al.

[11] Patent Number: 4,605,950

[45] Date of Patent: Aug. 12, 1986

[54] TWO CHANNEL COMPATIBLE HIGH DEFINITION TELEVISION BROADCAST SYSTEM

[75] Inventors: Abraham A. Goldberg, Stamford; Renville H. McMann, New Canaan; John P. Rossi, Stamford, all of Conn.

[73] Assignee: CBS Inc., New York, N.Y.

[21] Appl. No.: 534,026

[22] Filed: Sep. 20, 1983

[51] Int. Cl.$^4$ .................. H04N 9/42; H04N 9/38
[52] U.S. Cl. ................... 358/11; 358/12; 358/141
[58] Field of Search ............ 358/13, 12, 21 R, 11, 358/141

[56] References Cited

U.S. PATENT DOCUMENTS 3,970,776  7/1976  Kinuhata et al. ............. 358/140

FOREIGN PATENT DOCUMENTS 2132846  7/1984  United Kingdom ............. 358/12
2132444  7/1984  United Kingdom ............. 358/12

OTHER PUBLICATIONS

Jackson et al, System Concepts in High Fidelity Television, IEEE International Broadcast Convention 18-21, Sep. 1983, pp. 135-139.

Kerns H. Powers, Compatibility Aspects of HDTV, High Definition Television Colloquium 82, Oct. 18-21, 1982, pp. 1.6-1-1.6-17.

Primary Examiner—John W. Shepperd
Attorney, Agent, or Firm—Spencer E. Olson

[57] ABSTRACT

A television system for broadcasting high definition television on two channels of a direct broadcast satellite, a first of which carries a compatible 525-line picture. A second channel carries an augmentation signal, which in conjunction with the signal from the first channel, produces at a receiver tuned to both channels a 1050-line high definition television picture with a 5:3 aspect ratio. Time multiplex component signals and processing are employed, and high fidelity sound is provided by digital audio signals transmitted in time sequence with the video. There may be as many as five sound channels so as to provide three-channel stereophonic audio and various combinations of data and sound channels.

33 Claims, 15 Drawing Figures

FIG. 4.
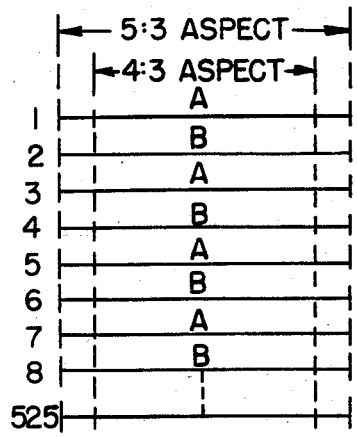
(A) ONE FIELD OF 1050 LINE HDTV PICTURE AT SENDING END
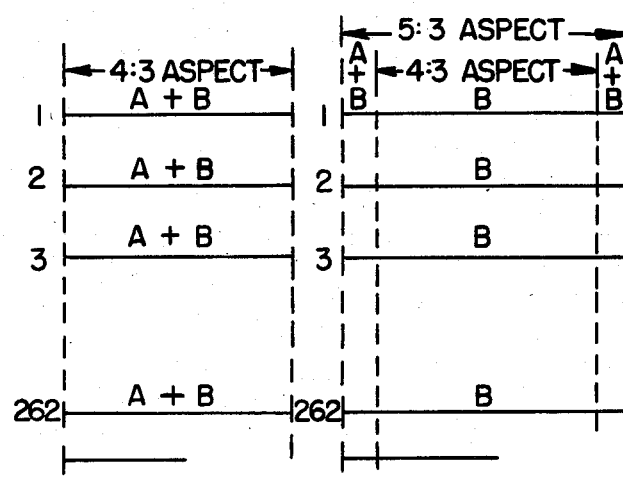
(B) ONE FIELD OF 525 LINE PICTURE VIA CHANNEL 1
(C) ONE FIELD OF 525-LINE PICTURE VIA CHANNEL 2
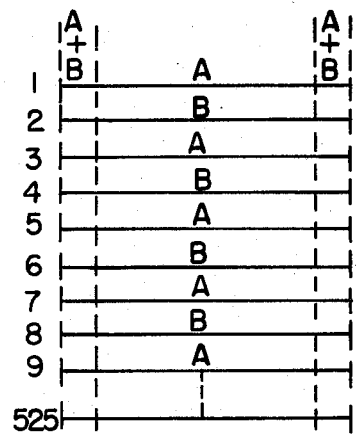
(D) ONE FIELD OF 1050-LINE HDTV PICTURE AT RECEIVER
LINE A = (A+B) − B
LINE B = B $$\text{FIELD 1, LINE A} = \frac{4}{3}\left(\frac{3}{4}A + \frac{1}{4}B\right) - \frac{1}{3}B \qquad A_{INT}$$

$$\text{FIELD 1, LINE B} = B \qquad B_{VF}$$

$$\text{FIELD 2, LINE A}' = A' \qquad A'_{INT}$$

$$\text{FIELD 2, LINE B}' = \frac{4}{3}\left(\frac{1}{4}A' + \frac{3}{4}B'\right) - \frac{1}{3}A' \qquad B'_{VF}$$

IN THE 4:3 AREA ONLY    SIDES

FIG. 12.

CHANNEL 1

ORIGINATION
- $Y_{4:3}$ |—— 21.02 μs ——| 903 SAMPLES AT 12 $F_{sc}$
- $C_{4:3}$ |—— 21.02 μs ——| 301 SAMPLES AT 4 $F_{sc}$

TIME MULTIPLEX COMPONENTS
- $Y_{4:3}$ |———— 42.04 μs ————| 903 SAMPLES AT 6 $F_{sc}$
- $C_{4:3}$ |— 14.01 μs —| 301 SAMPLES AT 6 $F_{sc}$

LINE RECEIVER
- $Y_{4:3}$ |———— 52.55 μs ————| 903 SAMPLES AT 24/5 $F_{sc}$
- $C_{4:3}$ |———— 52.55 μs ————| 301 SAMPLES AT 8/5 $F_{sc}$

1050-LINE RECEIVER
- $Y_{4:3}$ |—— 21.02 μs ——| 903 SAMPLES AT 12 $F_{sc}$
- $C_{4:3}$ |—— 21.02 μs ——| 301 SAMPLES AT 4 $F_{sc}$

CHANNEL 2

ORIGINATION
- $Y_{5:3}$ |—— 26.28 μs ——| 1128 SAMPLES AT 12 $F_{sc}$
- $C_{c5:3}$ |—— 26.28 μs ——| 376 SAMPLES AT 4 $F_{sc}$

TIME MULTIPLEX COMPONENTS
- $Y_{5:3}$ |———— 39.43 μs ————| { 1128 SAMP. AT 8 $F_{sc}$ OR 846 SAMP. AT 6 $F_{sc}$ }
- $C_{c5:3}$ |— 17.51 μs —| 376 SAMPLES AT 6 $F_{sc}$
- $C_l, C_r$ |—2.1 μs—|  |—2.1 μs—| 45 SAMPLES AT 6 $F_{sc}$

1050-LINE RECEIVER
- $Y_{5:3}$ |—— 26.28 μs ——| 1128 SAMPLES AT 12 $F_{sc}$
- $C_{c5:3}$ |—— 26.28 μs ——| 376 SAMPLES AT 4 $F_{sc}$
- $C_l, C_r$ |—3.14 μs—|  |—3.14 μs—| 45 SAMPLES AT 4 $F_{sc}$ EACH

FIG. 15.
NTSC
- 525 LINES
- COMB FILTERED
- 4:3 ASPECT RATIO
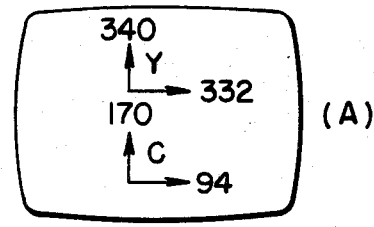 (A)
ENHANCED NTSC
- 525 LINES
- TIME MULTIPLEXED COMPONENTS
- LINE SEQUENTIAL COLOR
- 4:3 ASPECT RATIO
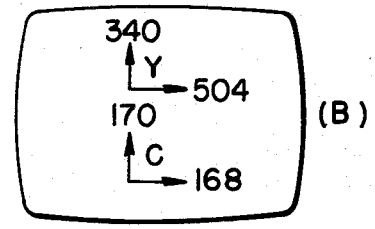 (B)
2 CHANNEL HDTV
- 1050 LINES
- TIME MULTIPLEXED COMPONENTS
- LINE SEQUENTIAL COLOR
- 5:3 ASPECT RATIO
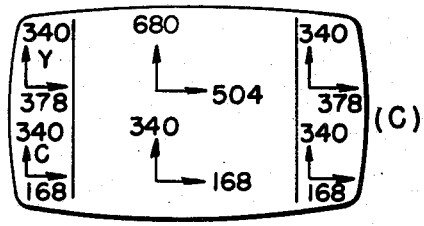 (C)

4,605,950

TWO CHANNEL COMPATIBLE HIGH DEFINITION TELEVISION BROADCAST SYSTEM

BACKGROUND OF THE INVENTION

This invention relates to television, and more particularly, to a high definition television broadcast system.

Advances in technology that have taken place since television was first broadcast nearly 50 years ago can provide a much higher quality television picture than is provided by currently available systems, and this coupled with changes in social environment and diversification of human consciousness, have created a demand for a new television system capable of providing richer information to the home viewer. High definition television (HDTV) requires high horizontal and vertical resolutions, a wide image aspect ratio, and high fidelity stereophonic sound, which desirably are achieved within the constraints of channel bandwidth and noise, compatibility with existing systems, receiver cost and psycho-visual needs. High vertical resolution calls for more scan lines than the 525 presently in use in North America and Japan. Japan Broadcasting Company (NHK) has proposed a high definition system with 1125 lines, 30 frames/sec (60 fields/sec), and 20 MHz luminance band width. Of the 1125 lines, 80 are in the vertical blanking interval, leaving 1045 displayable lines. Having determined from extensive tests that viewers prefer a wide screen similar to feature films, the aspect ratio (width to height) is 5:3 instead of the 4:3 of ordinary television.

Although the images provided by NHK's experimental system are impressive, far better than traditional television pictures by virtue of containing about eight times more information, its total baseband video band width of 30 MHz makes it more suitable for production than broadcasting. Any HDTV system should provide for conversion to existing standards, as by reading out an HDTV frame store at lower resolution and differing framing rates. However, the 1125 lines of the NHK system bear no simple relationship to the 525-line raster of the NTSC system, and, moreover, its field rate of exactly 60 Hz is unlike every other existing broadcast system; the NTSC system used in North America and Japan runs at 59.94 Hz to avoid a sound interference problem caused by 60 Hz operation.

A primary object of the present invention is to provide an improved HDTV broadcast system that will be readily convertible to the existing 525-line NTSC system.

Another object of the present invention is to provide an HDTV broadcast system that will be compatible with a time multiplexed component (TMC) broadcast and thus compatible with NTSC receivers using a component-to-NTSC converter.

Another object of the invention is to provide a dual standard television broadcast system in which compatible 525-line picture signals are broadcast on one channel and an augmentation signal is broadcast on a second channel to produce 1050-line, wide-screen HDTV pictures.

SUMMARY OF THE INVENTION

Briefly, the broadcast system according to the invention utilizes two channels, each 24 MHz wide and not necessarily contiguous, one of which carries 525-line pictures and the other of which carries an augmentation signal to produce 1050-line, wide screen HDTV pictures. The first channel carries 525-line, 60 (actually, 59.94) fields/sec., 4:3 aspect ratio, time multiplexed component (TMC) color television video plus three or more audio signals. The second channel carries an additional 525 lines of video, but with a 5:3 aspect ratio, which when matrixed with the signal from the first channel produces a HDTV picture. For reception in this dual standard system, an HDTV receiver is tuned to both channels, whereas a 525-line receiver receives a standard quality picture only from the first channel. Thus, two 24 MHz channels are required in order to broadcast a single HDTV program, but, at the same time the program can be received by a 525-line receiver.

In the interest of optimizing the interacting 525- and 1050-line systems, the first channel has the following specifications:

1. Color information is sent via time compressed line-sequential $R-Y$, $B-Y$ color difference signals.

2. Time compression of the color-difference signals is three times greater than that of the luminance time compression.

3. Digital audio is time-multiplexed with the video.

An interesting feature of the system is the dual-aspect ratio picture displayed by the receivers. Assuming the system is used for direct broadcast from a satellite (DBS), there will exist at the input to the DBS uplink a 1050-line, 5:3 aspect ratio video signal, derived, for example, from a production standard 1125-line HDTV camera already developed by NHK and a standards/converter for converting the camera output to 1050 lines with a 5:3 aspect ratio. In the interest of compatibility, only the central 4:3 aspect ratio area of the picture is transmitted with 525 lines through the first channel, and the balance of the HDTV picture consists of another 525 lines, 5:3 aspect ratio, which is transmitted on the second channel. A two-channel HDTV receiver reconstitutes the 5:3 aspect ratio picture by combining the video signals from both channels into a 1050-line, 2:1 interlace, 60-field/sec. raster. The central 80% of the area with 4:3 aspect ratio exhibits HDTV quality and the areas to the left and right of center, each representing 10% of the total picture area, exhibit interpolated 1050-line quality.

High fidelity sound is provided by digital audio signals transmitted in time sequence with the video. There may be as many as five sound channels so as to provide three channel stereophonic audio and various combinations of data and supplementary sound channels.

BRIEF DESCRIPTION OF THE DRAWINGS

Other objects, features and advantages of the invention, and a better understanding of its construction and operation, will be apparent from the following detailed description, taken in conjunction with the accompanying drawings, in which:

FIG. 4 is a diagram useful in the explanation of the scanning geometry of the improved television broadcast system;

FIG. 12 is a diagram showing the TMC timing of the two channels;

FIG. 15 is a diagram showing the resolution comparisons of the HDTV and 525-line systems of the invention with other systems.

DESCRIPTION OF THE PREFERRED EMBODIMENT

Figure 1:
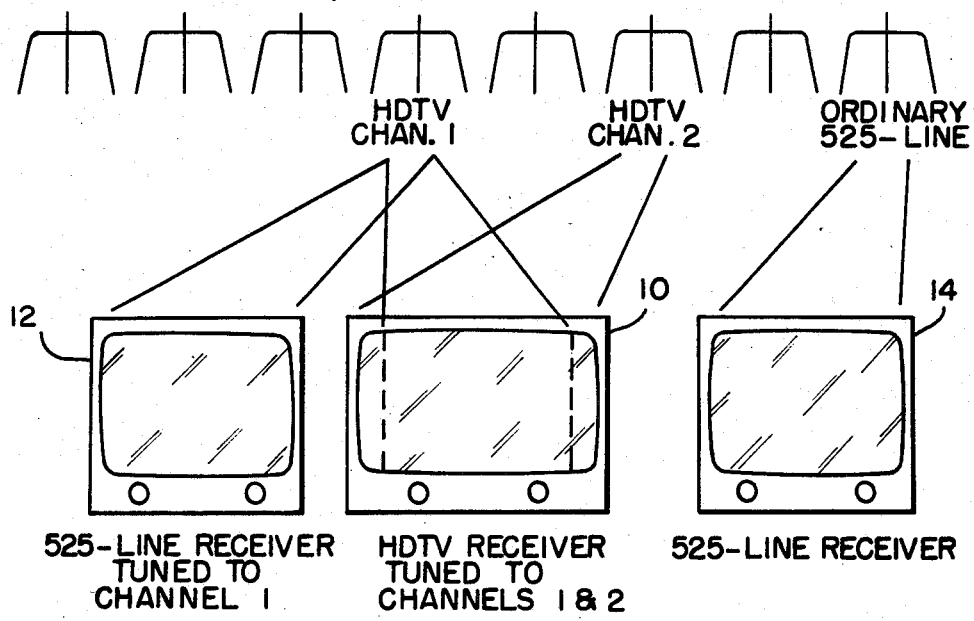
FIG. 1 is a diagram illustrating direct broadcast satellite (DBS) channel usage by the broadcast system according to the invention.

The broadcast system according to the invention, schematically illustrated in FIG. 1, is intended for use in direct broadcast from satellite (DBS) service in the United States to serve viewers through their local affiliated station and also provide for individual reception. Using two 24 MHz bandwidth co-polarized, cosited DBS channels, which need not be contiguous, the system broadcasts compatible 525-line pictures on one channel and an augmentation signal on a second channel which when combined with the first channel signal produces 1050-line, wide-screen, high definition television (HDTV) pictures; that is, it is a dual standard system. More particularly, one of the channels, labeled Channel 1, carries 525-line, 60 fields/sec. (rounded off, but as will be seen later, actually 59.94 fields/sec.), 4:3 aspect ratio, time multiplexed component (TMC) color television video plus three or more audio signals. A second DBS channel, labeled Channel 2, carries an additional 525-lines of video but with a 5:3 aspect ratio, which when matrixed with the signal from Channel 1 produces a wide screen HDTV picture. As indicated in FIG. 1, an HDTV receiver 10 is tuned on both Channels 1 and 2, whereas either of 525-line receivers 12 and 14 can receive a standard quality picture by tuning only to Channel 1. The full screen of receiver 10 has a 5:3 aspect ratio, whereas the area between the dotted vertical lines has an aspect ratio of 4:3, the same as that of receiver 12. As illustrated, conventional 525-line television signals can be broadcast from another available DBS channel for reception by the 525-line receiver 14.

On the premise that the signal format for DBS in North America will be time multiplexed component (TMC) video with digital audio, because of its potential for producing superior picture and sound quality, Channel 1 of the present system will be compatible with other TMC broadcasts and thus readily convertible for use with NTSC receivers using component color television signals. After examining the many issues for a 525-line TMC broadcast standard with intent to optimize the 525- and 1050-line systems, it was concluded that Channel 1 should have the following specifications:

1. Color information to be sent via time compressed line-sequential R−Y, B−Y color difference signals.
2. Time compression of the color-difference signals will be three times greater than that of the luminance time compression.
3. Digital audio will be time-multiplexed with the video.

Figure 2:
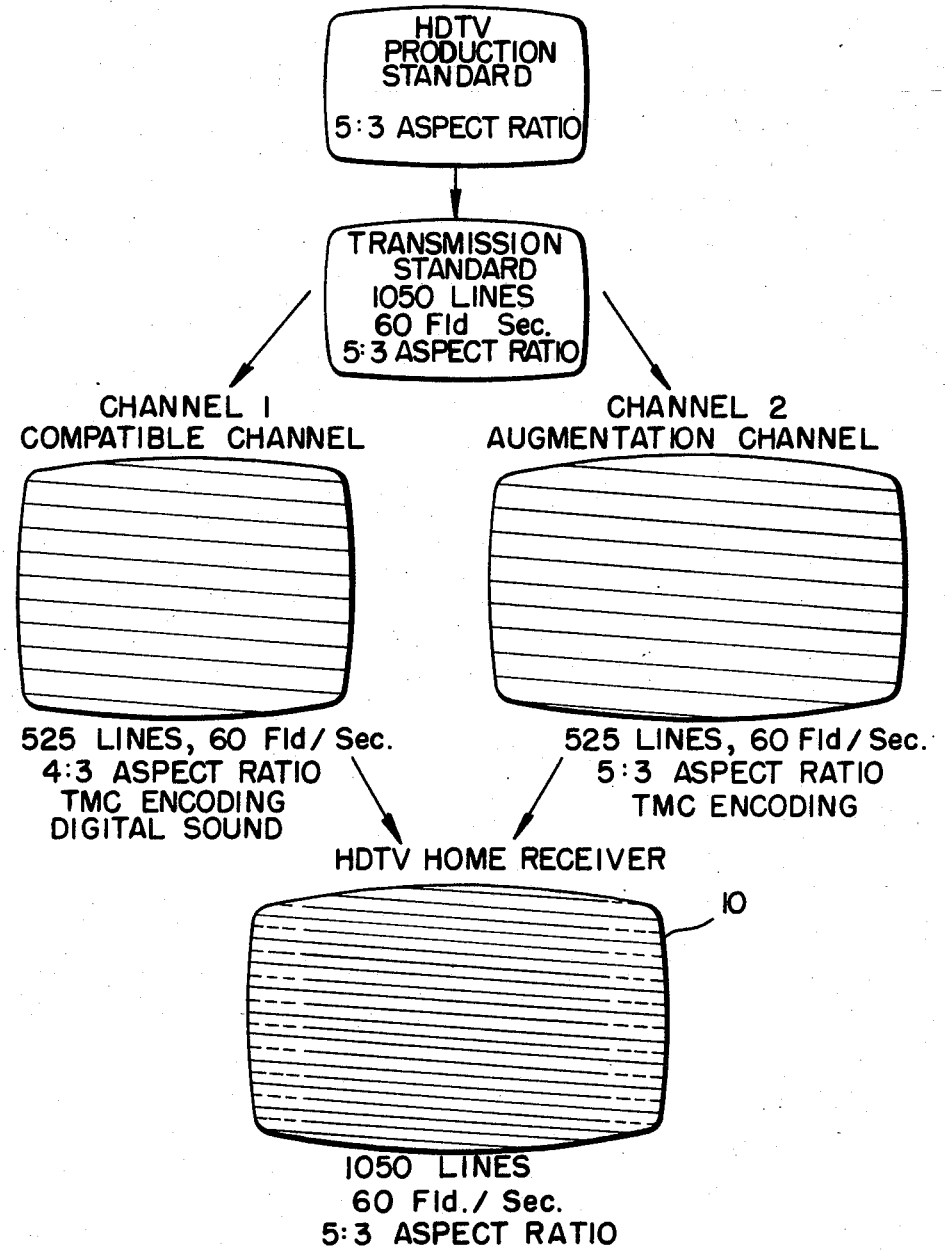
FIG. 2 is a functional diagram illustrating the general operation of the two-channel high definition television broadcast system according to the invention.

The HDTV system according to the invention is designed for broadcast in NTSC countries and evolves naturally from existing 525-line television standards. The system is not to be confused with a still to be defined HDTV production standard which, it is hoped, will be used throughout the world. Once such production standard is established, major programs will be produced in the HDTV production format (which could be the 1125-line, 60 fields/sec., and 5:3 aspect ratio proposed by NHK) and converted to the 1050-line HDTV standard of the present system, as well as to the 525-line standard, prior to broadcasting. Thus, as illustrated in FIG. 2, at the input to the DBS uplink there will exist a 1050-line, 5:3 aspect ratio TMC video signal. Rather than sending a 5:3 aspect ratio image in Channel 1, which would cause serious compatibility problems for users of 525-line, 4:3 aspect ratio receivers, only the center area of the picture, having a 4:3 aspect ratio, is transmitted with 525 lines in Channel 1. The balance of the picture, consisting of another 525 lines with a 5:3 aspect ratio, is transmitted via Channel 2. The 2-channel HDTV home receiver 10 reconstitutes the 5:3 aspect ratio picture by combining the two video signals into a 1050-line, 2:1 interlace, 60-field/sec. raster. The center 80% of the screen area, which has a 4:3 aspect ratio, exhibits full HDTV quality, and the left and right side areas (in which every other line is shown dotted) each of which comprise 10% of the screen area, exhibit interpolated 1050-line picture quality.

Figure 3:
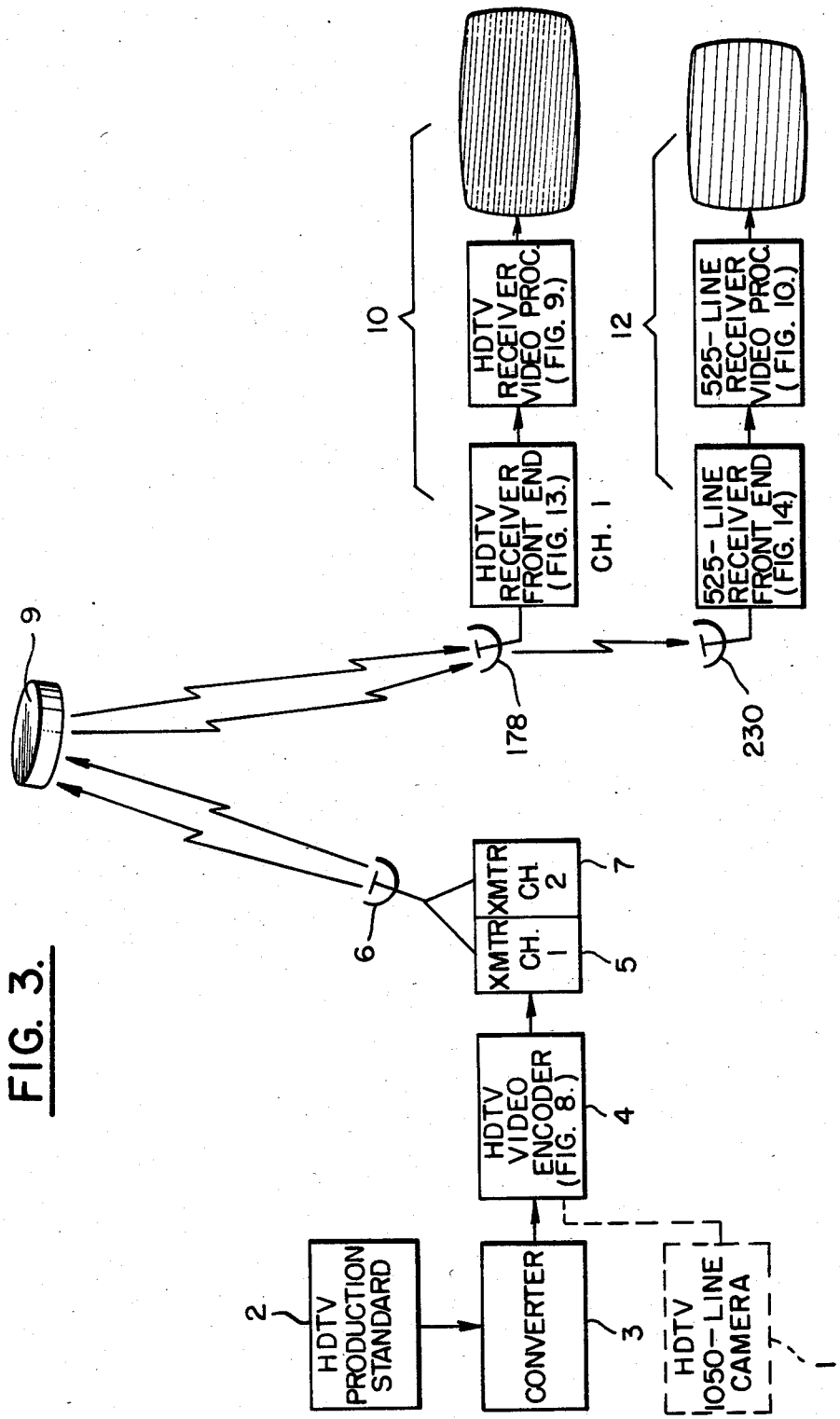
FIG. 3 is a general block diagram of the television broadcast system according to the invention configured for direct broadcast satellite (DBS) usage.
Figure 13:
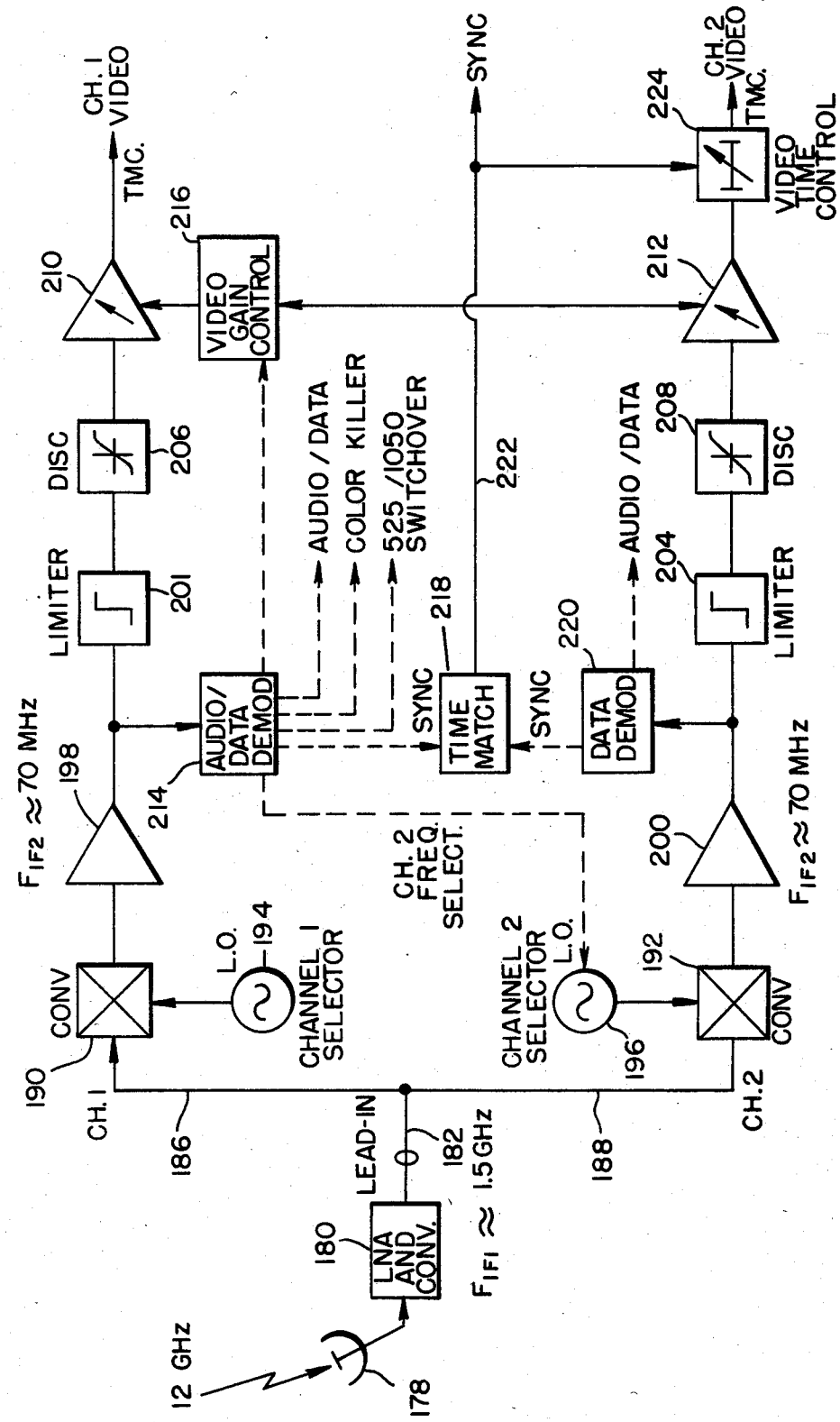
FIG. 13 is a block diagram of the front end of the HDTV receiver.

FIG. 3 is a simplified diagram of apparatus for performing the functions schematically outlined in FIG. 2, configured for usage for DBS broadcast. The program to be broadcast is produced in accordance with an established HDTV production standard 2, for example, the 1125-line, 60 field/sec., 5:3 aspect ratio picture proposed by NHK, and converted by a suitable converter 3 to the 1050-line HDTV standard of the present system. Alternatively, the 1050-line HDTV picture can be generated directly with a suitable camera 1. The resulting 1050-line, 5:3 aspect ratio analog component video signal is applied to an HDTV video encoder (the construction and operation of which will be described later in connection with FIG. 8), the general function of which is to partition the 1050-line signal into two 525-line signals, one for transmission on Channel 1 and the other for transmission on Channel 2. Only the 80% center area of the picture, having a 4:3 aspect ratio, is transmitted in Channel 1, and the other 525 lines, with a 5:3 aspect ratio, is transmitted via Channel 2. An encoder 4 produces two time multiplexed component analog television signals, one for each channel, which are frequency modulated on respective different frequency RF carriers and transmitted via a directive antenna 6 to a satellite 9 positioned in a predetermined geostationary orbital slot. The satellite direct broadcasts both channels via a down-link for reception by an HDTV receiver 10 having a directive antenna 178 pointed to the orbital slot of the satellite and/or by a 525-line receiver 12 equipped with an antenna 230 pointed toward satellite 9. The front end of the HDTV receiver 10, the details of which will be described in connection with FIG. 13, is tuneable to both channels and is operative to demodulate the received signals to recover the video from the two channels for application to a video processor (to be described in connection with FIG. 9) which reconstitutes the 5:3 aspect ratio picture by combining the two video signals into a 1050-line, 2:1 interlace, 60-field/sec., raster display. As indicated, the center 80% of the screen area, which has a 4:3 aspect ratio, exhibits full 1050-line quality, and the left and right side areas exhibit interpolated 1050-line picture quality.

The front end of the 525-line receiver 12 (to be described in connection with FIG. 14) is tuneable to receive only the Channel 1 signal and demodulates the received signal to recover the Channel 1 video signal for further processing by a video processor, the details of which will be discussed in connection with FIG. 10. The video processor converts the video to time multiplexed composite (TMC) video signals which are compatible with NTSC receivers designed to display 525-line, 2:1 interlace, 60 fields/sec., 4:3 aspect ratio, color television pictures.

FIG. 4 is a simplified diagram showing how the 1050-line HDTV scanned luminance image is carried in the two Channels 1 and 2. For simplicity, it will be assumed that a TV camera is scanned in the 1050-line format, one field of which (containing 525 lines) is shown in FIG. 4(A). The odd-numbered lines are labeled A and the even-numbered lines are labeled B. The horizontal bounds of the active picture are designated 5:3 aspect ratio for the full width and 4:3 aspect ratio for the central portion of the picture. Channel 1 carries 262½ lines per field, in the 4:3 aspect ratio area only, each line being the summation of lines A and B, as shown in FIG. 4(B). Channel 2 carries only line B of the 4:3 aspect ratio area and the summation of lines A and B of the two side portions of the 5:3 aspect ratio area, again 262½ lines per field, as shown in FIG. 4(C). In the reconstructed HDTV field in the home receiver 10, shown in FIG. 4(D), the odd-numbered lines A in the 4:3 aspect ratio area consists of A+B of Channel 1 less B from Channel 2, and the even-numbered lines B are lines B from Channel 2 and the side portions are A+B of Channel 2. Although the vertical resolution of the 4:3 aspect ratio area of the reconstructed picture will be the same as in the camera range, the side portions will have less than half the vertical resolution; this is acceptable because each side portion, representing 10% of the area, is peripheral information compared to the center 80% of the picture.

Figure 5:
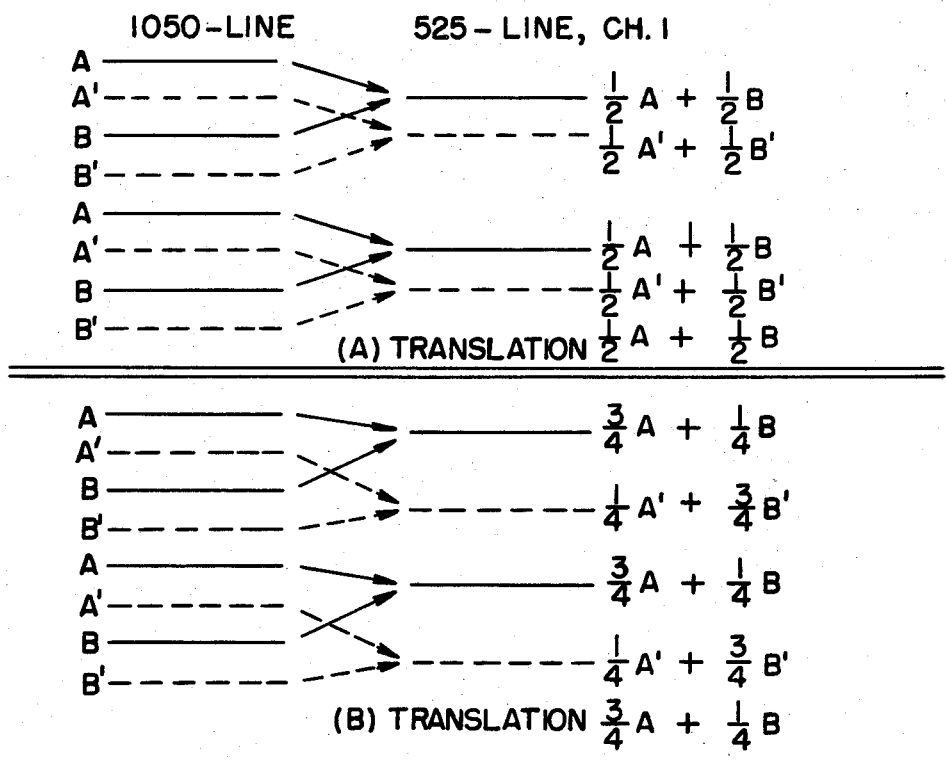
FIG. 5 is a diagram illustrating the spatial sampling utilized in the reconstruction of the HDTV picture.

However, when both odd and even fields are considered, it is evident that the line structures shown and described in FIG. 4 may have a shortcoming. In FIG. 5(A), lines A and B of the odd field of the 1050-line image are combined in the proportions ½A+½B to constitute the odd field in Channel 1. Likewise, lines A' and B' of the even field produce (½A'+½B') for the even field of Channel 1. It will be noted that the lines in Channel 1 represent paired spatial points on the vertical axis of the 1050-line image plane, and would cause the 525-line compatible picture of Channel 1 to lose some vertical resolution, although the 1050-line HDTV picture can be reconstructed with full resolution in the 4:3 aspect ratio area.

A solution for this paired sample problem, should it be necessary, resides in combining the lines with weighted coefficients in the manner shown in FIG. 5(B), namely, combining odd field lines in the proportions (¾A'¼B) and combining even field lines in the proportions (¼A'+¾B') for Channel 1 broadcast. In this manner, the equivalent spatial sampling points are evenly spaced on the vertical axis of the 1050-line HDTV picture.

Figure 6:
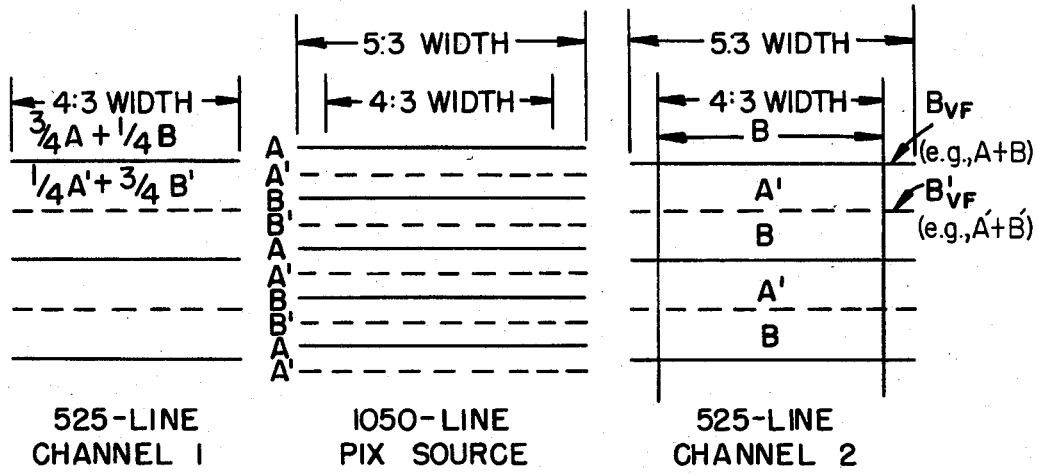
FIG. 6 is a diagram useful in the explanation of the matrix utilized in the receiver for reconstructing the HDTV picture.

Therefore, instead of the line arrangements of FIG. 4, the system preferably utilizes the odd (solid lines) and even (dash lines) fields of the 1050-line picture sources depicted at the center of FIG. 6, the scan lines carried by Channels 1 and 2 being depicted at the left and right, respectively. It will be observed that Channel 1 carries the 4:3 aspect ratio area lines (¼ A+¼ B) and (¼ A'+¾ B'). Channel 2 carries the 4:3 aspect ratio area lines B and A', as well as the side portions $B_{VF}$ and $B'_{VF}$, which represent vertically filtered lines B and B', respectively. Rather than using the simple 1:1 comb filter, represented by A+B or A'+B' in FIG. 4, it is desirable to utilize a better vertical filter, the general representation of which is $B_{VF}$ or $B'_{VF}$. The vertical filters for processing the side portions $B_{VF}$ and $B'_{VF}$ are of known construction and may take the form of a 1:2:1 comb filter which combines the information from three adjacent television lines with the center line given a weight which is twice the weight assigned to each of the two outside lines. The showing of FIG. 6 does not lend itself to identifying the three lines used for filtering to obtain $B_{VF}$ or $B'_{VF}$. Such filters are known, for example, from a report entitled "Line sequential colour transmission and vertical filtering in MAC" proposed by the British IBA (Independent Broadcasting Authority). In the two-channel HDTV receiver 10, a 1050-line image is reconstructed per the linear matrix operation depicted in the lower portion of FIG. 6. It will be noted that the sides consist of $A_{INT}$ and $A'_{INT}$ and $B_{VF}$, $B'_{VF}$, where $A_{INT}$ and $A'_{INT}$ are interpolated lines obtained by combining two or more $B_{VF}$ or $B'_{VF}$ lines, respectively.

Another advantage of the weighted coefficients is that they provide more equal signal-to-noise ratios (S/N) for lines A and B of the reconstructed HDTV picture. If it be assumed that the video signals from the Channel 1 and 2 receivers have equal noise voltages, N, for the case of even A and B weightings as shown in FIG. 4, the signal-to-noise ratio of the A lines of the reconstructed 1050-line picture is $$\frac{2[1/2A + 1/2B]_{Ch1} - B_{Ch2}}{[2N - N]_{RMS}} = \frac{A}{2.23N}$$

and the signal-to-noise ratio of the B lines is B/N. This represents an inequality of 7 dB between the S/N of lines A and B. For the case of the weighted coefficients utilized in FIG. 6, the S/N of the A lines of the reconstructed 1050-line picture is, $$\frac{4/3[3/4A + 1/4B]_{Ch1} - 1/3B_{Ch2}}{[4/3N - 1/3N]_{RMS}} = \frac{A}{1.37N}$$

and the S/N of the B lines is B/N, which represents an inequality of only 2.8 dB between the S/N of lines A and B. Actually, the S/N of lines A and B are in even closer balance because, as will be seen, the luminance video signal undergoes a slightly greater time compression in Channel 2 than it does in Channel 1.

Turning now to a general description of the video processing aspects of the 2-channel system, as previously mentioned, standards for an HDTV production system are still to be determined, one prospect being the 1125-line, 60 field, 2:1 interlace, 5:3 aspect ratio, with 20 MHz luminance bandwidth and 6 MHz color difference signal bandwidth, proposed by NHK. There being no production standard, it follows that there is not at the present a standards converter to interface production and broadcast HDTV signals. The present system is based on the premise that whatever the HDTV production standard ultimately adopted, it can be converted to a 1050-line, 2:1 interlace, 5:3 aspect radio format. In accordance with the present invention, this assumed format is reformatted to be carried 525-lines in each of two 24 MHz bandwidth DBS channels; Channel 1 carries a 525-line, 4:3 aspect ratio, color picture plus sound, while Channel 2 carries the additional picture information necessary to reconstitute the HDTV signal. The generation of a 525-line compatible signal for Channel 1 and of the augmentation signal for Channel 2 will now be described with reference to FIG. 7.

As briefly discussed earlier in connection with FIG. 6, at the sending end, the 1050-line HDTV signal is partitioned into two 525-line pairs A and B, each line-pair consisting of two time-sequential lines from the same field. The luminance occupies a baseband width of 16.0 MHz and the active line period is 26.3 microseconds. Considering first the generation of the 525-line, 4:3 aspect ratio picture from the 1050-line, 5:3 aspect ratio source picture, it will be understood that the source signals are R, G and B color signals which have been combined in a conventional linear matrix to produce a luminance component, Y, and two color difference signals, R−Y and B−Y. The 1050-line HDTV signal is partitioned into two 525-line pairs, A and B, shown in FIG. 7(A), each line-pair consisting of two time sequential lines from the same field. Each line has an active length of 26.3 microseconds (half that of the active area of a 525-line signal). Using the weighting coefficients discussed above, lines A and B are combined into an AB signal and the side areas are cropped to the 4:3 aspect image to generate the matrixed AB luminance signal shown as waveform (B) in FIG. 7 which, it will be noted, has an active line length of about 21 microseconds, with the luminance occupying a base bandwidth of 16.0 MHz. Prefiltered line-alternate color difference signals R−Y/B−Y from lines A and B (waveform (C) in FIG. 7) are cropped to produce the 4:3 aspect ratio signal $C_c$, shown in waveform (D), having an active length of 21 microseconds and with the color signal occupying a baseband width of 5.3 MHz.

On the assumption that other broadcasters will employ 525-line transmissions with a luminance to color difference bandwidth ratio of 3 to 1, the matrixed $(AB)_{WB}$ luminance signal (waveform (B)) is substantially three times the bandwidth of the color difference signals of the 4:3 aspect ratio signal $C_c$. The luminance signal, $(AB)_{WB}$, and the line-alternating color difference signals, $C_c$, are then time division multiplexed into the 63.5 microsecond line period of a 525-line signal as shown in waveform (F) of FIG. 7. This is achieved by time expanding the $(AB)_{WB}$ signal by a factor of two, which results in a two-to-one reduction of the signal frequency, namely, to a baseband width of 8 MHz. The color signal $C_c$ is time compressed by a three-to-two factor, which causes the maximum signal frequency to become 8 MHz, the same as that of the luminance signal. Thus, the time division multiplexed luminance and color difference signals occupy 56 microseconds, leaving about 7.5 microseconds per line period for signal transitions, clamps, audio and sync signals.

It will be recognized that the signal format (waveform (F)) for DBS Channel 1 is a typical 525-line time multiplexed component television signal; therefore, a 525-line DBS receiver could readily convert the TMC luminance and the line sequential color difference signals to occupy the 52.6 microsecond active period of a scan line and an enhanced quality picture having about 6.4 MHz of luminance bandwidth and 2.13 MHz color difference bandwidths.

Turning now to a functional description of the generation of the augmentation signal carried by the DBS Channel 2, as has been noted previously, this channel carries the additional information that when added to the information from Channel 1, reconstitutes the HDTV picture. It will be recalled from the description of the Channel 1 signal that Channel 1 carries only matrixed information from line pairs AB. As will be seen later, separation of line A from line B in the HDTV display is accomplished by a complementary matrix which depends for its operation on the availability of either an unmatrixed line A or line B of the 525-line pairs. For the sake of simplicity at this juncture, line B of the 5:3 aspect picture is low-pass filtered to 12 MHz to produce the signal $B_{LF}$ illustrated as waveform (G) in FIG. 7 for transmission in Channel 2.

Figure 7:
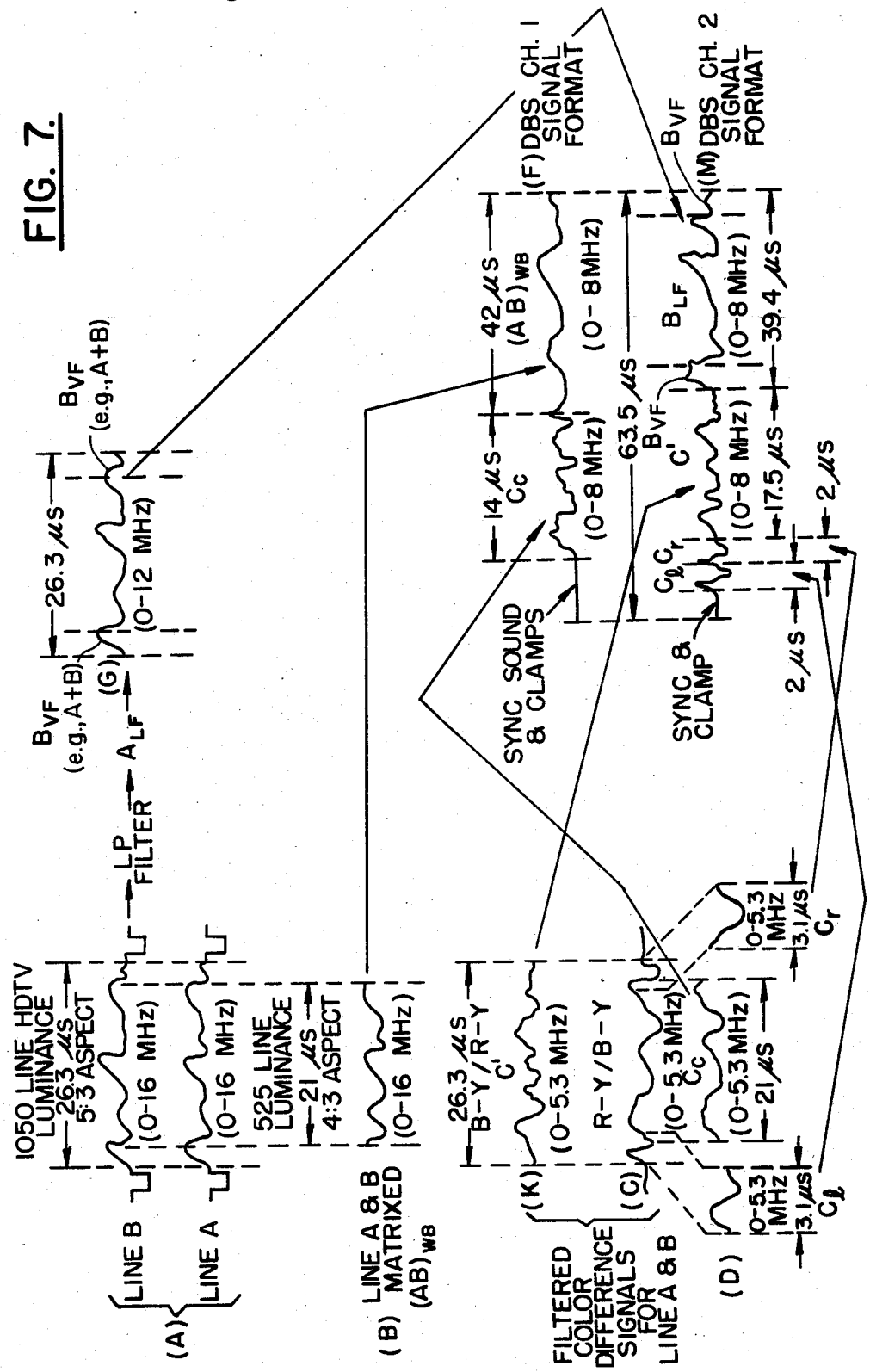
FIG. 7 is a diagram showing time expansion/compression and multiplexing of Y, R−Y, B−Y for two-channel DBS HDTV transmission.

Recalling from the above description that Channel 1 carries line alternate color difference signals for only the 4:3 aspect ratio picture, that is, signal $C_c$ shown in waveform (D), Channel 2 must, therefore, carry the other color difference signal, designated C' and illustrated as waveform (K) in FIG. 7, with a 5:3 aspect. In addition, Channel 2 carries the missing color signal $C_l$ and $C_r$ for the left and right sides, respectively, of the 5:3 aspect ratio picture; these signals, each having an active line period of 3.1 microseconds and a color difference bandwidth of 5.3 MHz, are shown to the left and right, respectively, of the $C_c$ waveform, and slightly overlap the $C_c$ signal.

The luminance signal $B_{LF}$ and the alternating color difference signals C' are the time division multiplexed into the 63.5 microsecond line period of a 525-line signal (waveform (M)). The color difference signal C' is time compressed by a three-to-two factor, which causes its maximum signal frequency to become 8 MHz, and the $B_{LF}$ signal is appropriately time expanded so as to also occupy a baseband width of 8 MHz. The color difference signals $C_l$ and $C_r$ are each time compressed to two microseconds and slightly overlap the $C_c$ signal in Channel 1 to permit clean reconstruction of the 5:3 aspect color image in the HDTV receiver. Thus, it is seen that 60.9 microseconds of the line period are allocated for the $A_{LF}$, C', $C_l$ and $C_r$ signals, leaving 2.6 microseconds per line period for clamping and synchronizing pulses, and possibly audio/data.

As will have become evident from the description thus far, the circuits for implementing the time expansion/compression and multiplexing to produce the signals for the two channels require accurate timing and the generation of multiple clock signals. As will be seen, the various time compression and decompression processes are accomplished with memory devices into which sampled video signals are written at one frequency, $F_w$, and read out at a different frequency, $F_r$, where $F_r/F_w$ is the time compression (or bandwidth expansion) ratio being applied to the signal. Since different compression ratios are used at various stages of the system, several interrelated clock frequencies are required, these preferably being generated from a single master clock having a frequency $F_M$. In defining the compression/expansion ratios at different stages of the HDTV system, it is desirable (and probably essential) to maintain clock relationships that result in integer numbers of samples per television line at all stages of the video processing; that is, an integer number of samples per line should result when a television line is sampled in either its compressed form or its expanded form, for both the 5:3 and 4:3 aspect ratio pictures. Recalling that Channel 1 broadcasts a 4:3 aspect ratio picture obtained from the 5:3 aspect picture by selecting 4/5 of each 5:3 television line, the number of samples per line for the HDTV luminance signal must be divisible by 5; that is, it must contain 5 as a factor.

Compared to the luminance signal, each color difference signal has a third of the bandwidth, employs one-third the sampling frequency and, therefore, has one-third the number of samples per line. Consequently, the number of samples per line for the HDTV luminance signal should be divisible by 3 (as well as by 5).

The sampling frequency, $F_s$, for the HDTV luminance signal is chosen to be between 2.2 and 2.5 times the highest video frequency, and more accurately determined by the integer number of samples per television line period. The line period being the inverse of the horizontal scan frequency, which is exactly given by the frame rate times the number of scan lines per frame, brings up the question of whether the field rate of the DBS HDTV signal should be 60 Hz or the 59.94 Hz field rate of the 525-line NTSC standard. Regardless of the choice, its effect on HDTV signal processing is minimal and will simply change all clock frequencies by the exact factor 1.001.

By definition, the frequency $F_M$ of the master clock is the highest frequency required in a processing system, and desirably is minimized. The highest video sampling frequency, $F_s$, is that of the HDTV luminance signal. Since one of the signals generated by the processing is for a 525-line 4:3 aspect ratio picture (that is, one half the line rate and four fifths the line width of the 1050-line HDTV picture), one of the required clocks is $(\frac{1}{2} \times 4/5)F_s = 2/5 F_s$. This implies that if all clocks are to be derived by simple count-down from $F_M$, the master clock will be at least equal to $2F_s$, in which case $F_M$ will be divisible by 2, 3, and 5. All other clocks in the system are related to $F_M$ by a combination of these factors, thereby to simplify the system and automatically guarantee an integer number of samples per television line at any stage of the signal processing.

Having in mind that $F_s$ is 2.2 to 2.5 times the video bandwidth of 16 MHz, making the value of $F_s$ about 40 MHz, in order for the master clock to have a frequency of $2F_s$, it should be between 80 MHz and 90 MHz. A clock frequency near 40 MHz possessing the necessary sample-per-line relationships discussed above is 40.635 MHz for 60 Hz field rates or 40.594406 MHz for 59.94 Hz field rates; both are nearly equal to three times the 13.5 MHz sampling frequency proposed for digital television studios.

The system now to be described utilizes another suitable HDTV luminance sampling frequency, $F_s$, which meets all the sample-per-line relationships; that sampling frequency is 42.9545 MHz, which happens to be equal to 35/11 of 13.5 MHz, or 12 $F_{sc}$, where $F_{sc}$ is the NTSC color subcarrier frequency. This clock frequency is obviously suitable for a 59.94 Hz field rate system.

Figure 8:
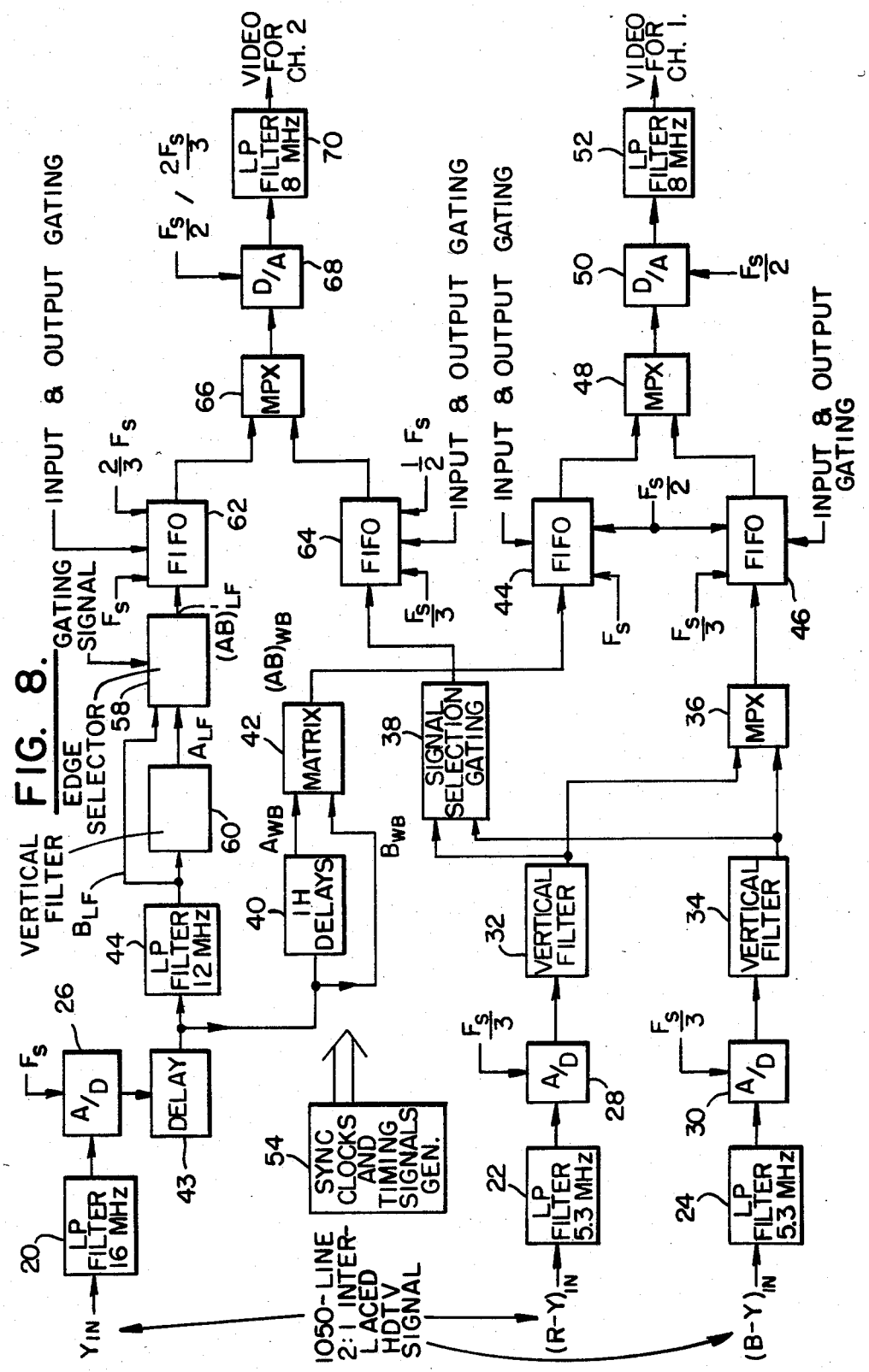
FIG. 8 is a block diagram of a video encoder for the two-channel HDTV broadcast system according to the invention.

The basic processes involved in the generation of two 8 MHz video signals, one for DBS Channel 1 and the other for DBS Channel 2 having been described, reference is now made to the block diagram shown in FIG. 8 of an HDTV video encoder for performing the required video processing. The originating 1050-line input signals, which have been matrixed into Y, R−Y, B−Y component signals, are low-pass filtered to 16 MHz, 5.3 MHz, and 5.3 MHz, respectively, by low-pass filters 20, 22, and 24, respectively. The luminance signal, Y, is converted by an analog-to-digital converter 26, at a sampling rate of $F_s$, to linear PCM digital signals, and the color difference signals R−Y and B−Y are converted by analog-to-digital converters 28 and 30, respectively, with sampling rates of $F_s/3$, to linear PCM digital signals. The digital color difference signals are vertically filtered by conventional vertical filters 32 and 34, respectively, the outputs of which are applied as first and second inputs to a multiplexer 36, and also as first and second inputs to a signal selection gate 38, the functions of which will be described presently. The vertical filters are of known construction and may take the form of 1:2:1 comb filters for combining signal information from two or more television lines for limiting the "aliasing defects" which may arise from the transmission of the two color difference components on alternate lines.

The digitized luminance signal representing line pairs A and B produced at the output of A/D converter 26 is applied to a delay circuit 43 which exhibits a delay equal to the delay introduced in the color difference signals by vertical filters 32 and 34. It is provided to maintain the correct timing between the luminance signal and the color difference signals. If 1:2:1 comb filters are used for the vertical filters, delay circuit 43 delays the luminance signal by one H period; that is, the period of one horizontal line. The output of delay circuit 43 is applied as one input to a matrix 42 of conventional design and also to the input of a delay line 40 for delaying the signal by the period, H, that is, the period of one horizontal line, prior to its application as a second input to matrix 42. Consequently, whenever line $A_{WB}$ appears in the delayed signal, line $B_{WB}$ in the undelayed signal appears in time coincidence therewith to permit their being matrixed. The matrix is operative to matrix the line pairs with the weighting coefficients shown in the upper left-hand portion of FIG. 6 to produce a wideband $(AB)_{WB}$ signal at its output.

The central 4/5ths of every other $(AB)_{WB}$ line combination is written into a first in-first out (FIFO) memory device 44 at $F_s$ rate, the central 4/5ths being obtained by gating the active line to provide the 4:3 aspect ratio. The FIFO 44, of known construction, may comprise a pair of shift registers into one of which data is written as data is being read out from the other, or it may consist of two banks of random access memories (RAMs). The line combination written into memory device 44 is read out every 63.5 microsecond line period at a $F_s/2$ rate, causing a time expansion by a factor of two and an attendant frequency compression by a factor of two. Accordingly, the video read out of FIFO 44 occupies 8 MHz of base bandwidth.

Every two lines, multiplexer 36 selects alternately between color difference signals R−Y and B−Y, and these are written into a second FIFO memory device 46 at a $F_s/3$ rate with the 4:3 aspect (i.e., the central 4/5ths of the active line is selected by suitable gating of the FIFO 46), and then read out every 63.5 microsecond line period at a $F_s/2$ rate. This results in a three-to-two time compression which, in turn, causes the base bandwidth of the color difference signals to be expanded by 3/2, from 5.3 MHz to 8 MHz. The 4:3 aspect ratio luminance signal from FIFO 44 and the color difference signals from FIFO 46 (designated $C_c$ in FIG. 7) are then multiplexed in a multiplexer 48 which first selects one or the other of the alternately occurring color difference signals, and then the luminance signal, to form the 525-line TMC signal illustrated in waveform (F) of FIG. 7. After digital-to-analog conversion in a D/A converter 50, clocked at a $F_s/2$ rate, and filtering in a low-pass filter 52 to 8 MHz, this becomes the video signal for DBS Channel 1.

All the clocks and timing information are generated from a master clock, represented by block 54, having a frequency $F_M$ equal to $2F_s$ and locked to the horizontal scan frequency of the 1050-line signal. The timing signal generator 54 also generates a data clock $F_d$ which is transmitted in the data channel and serves to synchronize the receiver clocks. Connections from block 54 to other blocks of the system which require timing signals have been omitted in the interest of simplification of the diagram.

A similar process is used to generate the TMC video signal for Channel 2. The 16 MHz digital signal from A/D converter 26 is filtered to 12 MHz by a low-pass filter 44 to obtain one low frequency luminance signal. This low-passed luminance signal of line B, labeled $B_{LF}$, is directly applied to one input of a edge selector 58 and is also vertically filtered by a vertical filter 60 to provide the low frequency side signal $B_{VF}$ (e.g., $A_{LF}+B_{LF}$) for the edges of the active line in time coincidence with the low frequency signal $B_{LF}$ of line B. The output of vertical filter 60 is applied to a second input of the edge selector, which is operative in response to an edge gating signal to select the signal $B_{LF}$ for the central part of the active line (that is, the 4:3 aspect ratio signal), and the signal $B_{VF}$ for the edges of the active line, to produce a low frequency $(AB)'_{LF}$ signal at its output. The active portion of every other one of the $(AB)'_{LF}$ lines is written into a first in-first out memory device 62 at $F_s$ rate and read out at the rate of $2 F_s/3$, resulting in a 3/2 time expansion, or a frequency compression of $\frac{2}{3}$, thereby reducing baseband width of the 12 MHz luminance signal to 8 MHz.

The signal selection gating means 38 selects in proper order to active line segments of the color difference signals (shown in the lower lefthand corner of FIG. 7) to ultimately produce the multiplexed color difference portion of the signal format shown in waveform (M) of FIG. 7. In particular, circuit 38 selects first the $C_I$ segment, then the $C_r$ segment, and every two lines selects either $R-Y$ or $B-Y$; for the lines when $R-Y$ is selected for C', the circuit selects $B-Y$ for the side segments $C_I$ and $C_r$ and, conversely, when $B-Y$ is selected for C', $R-Y$ is selected for the "side" segments. The timing of multiplexer 36 and selection circuit 38 is such that when $B-Y$ is selected by multiplexer 36, $R-Y$ is being selected for the C' signal by selection circuit 38, and when $R-Y$ is being selected by the multiplexer 36, signal selection circuit 38 selects $B-Y$ for the C' signal. The resulting color difference signals produced at the output of selection circuit 38 are written into a fourth first in-first out memory device 64 at $F_s/3$ rate and read out at a rate of $F_s/2$. This results in a 3/2 time compression, or a frequency expansion of $\frac{3}{2}$, causing the baseband width of the color difference signals appearing at the output of FIFO 64 to be $3/2 \times 5.3$ MHz=8 MHz.

The luminance signal $(AB)'_{LF}$ from FIFO 62 and color difference signals from FIFO 64 are time multiplexed in a multiplexer 66 which selects in order the $C_I$ color difference signal, the $C_r$ color difference signal, the C' color difference signal, and then the luminance signal, to form the 525-line TMC signal illustrated in waveform (M) of FIG. 7. After D/A conversion in a converter 68 clocked at $F_s/2$ during the color portion and at $2 F_s/3$ during the luminance portion, and low-pass filtered to 8 MHz by a filter 70, this signal becomes the TMC video signal for DBS Channel 2.

For transmission, the described time multiplexed component analog television signals for the DBS Channels 1 and 2 are preferably frequency modulated on respective RF carriers, and audio/data, picture sync and sundry control signals (to be described) are time multiplexed with the video. Referring to the block diagram of an HDTV receiver shown in FIG. 9, and deferring until later a description of the receiver front end, this receiver combines the video signals from the DBS Channels 1 and 2 and performs processes complementing those of the just-described HDTV encoder. Appropriate clocks and timing signals, synchronized to $F_d$ signals from both channels are generated by a clock and timing signal generator 80. Again, in the interest of simplifying the diagram, the connections from generator 80 to the various signal processing devices requiring timing pulses have been omitted. The Channel 1 video signal is digitized by an A/D converter 82 clocked at a $F_s/2$ sampling rate, and the Channel 2 video signal is digitized by an A/D converter 84 clocked at a sampling rate of $F_s/2$ during the color portion of the TMC signal and at a $2F_s/3$ sampling rate during the luminance portion. These are, of course, the sampling frequencies that are used for the digital-to-analog conversions in the HDTV encoder of FIG. 8 that generates the two channel signals for transmission.

The digitized Channel 1 video signal, having the format shown in waveform (F) of FIG. 7, is applied to a demultiplexer 86 which separates it into its luminance, Y, and color difference signals, C, for separate processing. The luminance component is time compressed by a factor of two in a first in-first out memory device 88 by writing the signal in at a rate of $F_s/2$ and reading it out at $F_s$ rate, thereby to convert it to an HDTV line period signal. Memory device 88 is suitably gated so that its output signal is in time coincidence with the corresponding 4/5 central portion of the luminance component received via Channel 2, as will be described later. This time compression causes the signal bandwidth at this stage to be expanded to 16 MHz. The resulting luminance signal $(AB)_{WB}$ is applied to the plus input of a subtracting circuit 92, and is also low-pass filtered to 12 MHz by a filter 90 to produce the low frequency signal $(AB)_{LF}$, which is applied to the minus input of subtraction circuit 92 for subtraction from the $(AB)_{WB}$ signal to produce a high frequency luminance signal, $Y_{HF}$, covering the band from 12 MHz to 16 MHz. The signal $Y_{HF}$ contains luminance information from each line pair AB and is the common high frequency signal that is mixed back into the lines $A_{LF}$ and $B_{LF}$, after de-matrixing, to be described.

The color difference signals $C_c$ from Channel 1 are time expanded by 3/2 times in a first in-first out memory device 94 by writing the signal in at $F_s/2$ and reading out at $F_s/3$, and applied to a device 96 for splicing the color for the picture edges to the color signal $C_c$ to reconstruct the HDTV active line. It will be recalled from the description of the HDTV encoder that the color difference signals transmitted by Channel 1 are for only 4/5ths of the HDTV active line and, therefore, need to be augmented at the two sides by the "side" color signals transmitted via Channel 2. To this end, a demultiplexer 98 separates the digitized TMC signal from A/D converter 84 into the color components $C_l$, $C_r$, and $C'$ in that order, followed by the luminance signal, Y. The $C_l$ and $C_r$ color signals are time expanded by 3/2 times by respective first in-first out memory devices 100 and 102 by writing in at a rate of $F_s/2$ and reading out at a rate of $F_s/3$, and the resulting signals applied as second and third inputs to splicer 96. Splicer 96 includes means for switching from the left side signal $C_l$ input, to the center signal $C_c$ input, to the right side signal $C_r$ input, at proper times during a television line and repeating the process on alternate lines. The "spliced" color signal is applied to a color difference signal interpolating filter 106, the purpose of which will be described presently.

The color signals $C'$ from Channel 2 are also time expanded by 3/2 times in a first in-first out memory device 104 by writing at $F_s/2$ and reading at $F_s/3$, and the resulting signal is applied to a second interpolating filter 105. Interpolating filters 105 and 106 are of known construction and perform line-to-line averaging of two or more successive lines to reconstruct the lines that were not transmitted to generate simultaneous HDTV R−Y and B−Y signals. The signals from interpolating filters 105 and 106 are applied to a multiplexer 107 which on alternate lines steers the signal from filter 106 to the input of a D/A converter 108 and the signal from filter 105 to a D/A converter 110. During the next alternate lines the signal from filter 106 is steered to D/A converter 110 and the signal from filter 105 is steered to D/A converter 108. This causes color difference signal R−Y to be applied to D/A converter 108 exclusively and color difference signal B−Y to be applied only to D/A converter 110. The D/A converters 108 and 110, each clocked at a rate of $F_s/3$, convert the R−Y and B−Y signals to analog and, after low pass filtering at 5.3 MHz by respective low-pass filters 112 and 114, are available to be used in a 1050-line HDTV display.

The complementary luminance signal, $(AB)'_{LF}$, from Channel 2 is time compressed in a first in-first out memory device 116 by writing at $\frac{2}{3} F_s$ and reading at $F_s$, into an HDTV line period signal having the full 5:3 aspect and a baseband width of 12 MHz. This signal, along with the signal $(AB)_{LF}$, derived from the Channel 1 video signal, are applied as inputs to a dematrix device 118. The dematrix device utilizes a known arrangement of adders and subtractors, and the weighting coefficients shown in the lower portion of FIG. 6, for converting the combined AB lines back to the separate $A_{LF}$ or $A'_{LF}$ or $B_{LF}$ or $B'_{LF}$ lines of the HDTV line pairs; it will be recognized, however, that full separation of the signals $A_{LF}$ and $B_{LF}$ is possible only for the central 80% area of the picture because $(AB)_{LF}$ is available only for the 4:3 aspect picture. The signals $A_{LF}$ and $B_{LF}$ (or $A'_{LF}$ and $B'_{LF}$) produced at the output of dematrix 118 are selected in a multiplexer 120a, forming part of a side interpolator device 120, during the central 80% active area of the picture under control of an edge gating signal. At the left and right 10% areas of the picture, the vertically filtered signal $B_{VF}$ (that is, the edges of $(AB)'_{LF}$ from Channel 2 is selected on alternate lines and $A_{INT}$ produced at the output of a line interpolation filter 120b is selected for the other lines. This is accomplished by means of a multiplexer 120c controlled by a suitable gating signal. The side signals $B_{VF}$ or $A_{INT}$ are then inserted into the side portions of the picture by means of multiplexer 120a. The line interpolation filter 120b preferably is a known form of digital interpolator which averages two successive lines to generate the intermediate missing line; such interpolators are known as 1:2:1 vertical interpolator filters. A smooth transition from the center 4/5 of the picture to the sides is achieved by using known video "fading" techniques.

In order to extend the horizontal resolution of the HDTV picture, the $Y_{HF}$ information derived from the Channel 1 luminance signal is mixed with the $A_{LF}$ and $B_{LF}$ lines by adding the $Y_{HF}$ signal into the $A_{LF}$ and $B_{LF}$ signals in a mixing circuit 121. The output of mixing circuit 121 is applied to a D/A converter 122, clocked at $F_s$, and the resulting analog signal is filtered to 16 MHz in a low-pass filter 124 to provide the luminance signal for the 1050-line HDTV display.

Thus, it is seen that the video processor of the HDTV receiver reconstitutes the 5:3 aspect ratio picture by combining the two video signals from Channels 1 and 2 into a 1050-line, 2:1 interlace, 60-field raster. The 4:3 aspect central 80% of the picture area exhibits HDTV quality and the left 10% and the right 10% side areas exhibit interpolated 1050-line quality.

Figure 10:
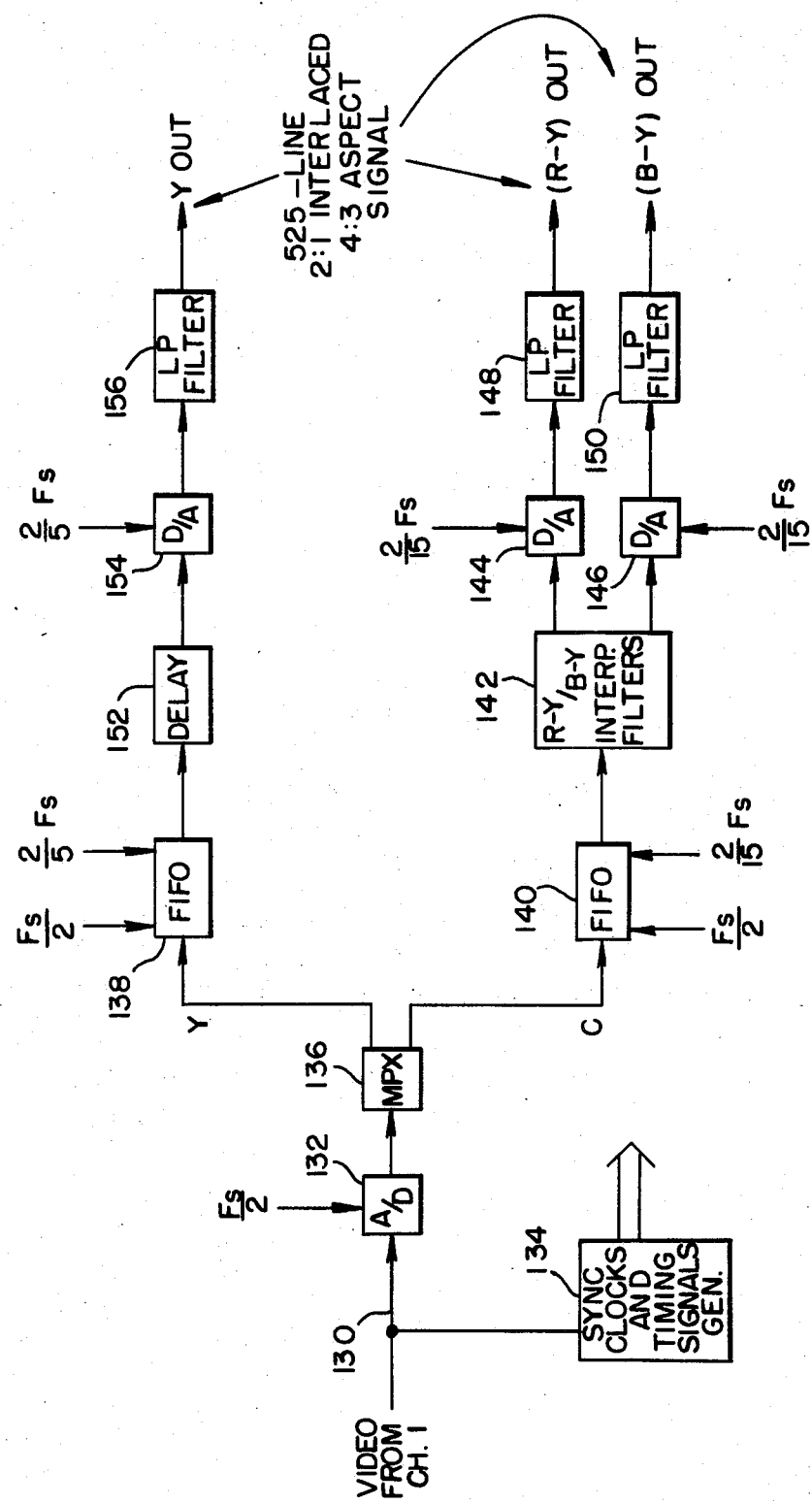
FIG. 10 is a block diagram of the video processor of the 525-line receiver.

FIG. 10 is a block diagram of the video processor for a 525-line receiver tuned to DBS Channel 1. The decoding processor is quite similar to that of a typical 525-line DBS receiver for time division multiplexed component signals. The received Channel 1 signal is demodulated by conventional means (not shown in this figure but described later in connection with FIG. 14) and the video signal, appearing on input line 130, is digitized by an analog-to-digital converter 132 clocked at an $F_s/2$ rate. Synchronizing pulses stripped from the incoming video signal are used to synchronize a timing signal generator 134 which generates sync clocks and other timing signals for clocking A/D converter 132 and other signal processing devices. Connections from signal generator 134 to the affected blocks of the diagram have been omitted in the interest of simplification.

The digitized signal from converter 132 is applied to a multiplexer 136 which includes a digital decoder and suitable filters for separating the TMC video signal into its luminance, Y, and line sequential color difference signals, $C_c$. The luminance signal is applied to and time expanded by a factor of 5/4 by a first in-first out memory device 138 by writing at a clock rate of $F_s/2$ and reading out at $2F_s/5$. The line sequential color signals are time expanded by a factor of 15/4 by a first in-first out memory device 140 by writing at an $F_s/2$ rate and reading out at a rate of $2F_s/15$. As is conventional in color sequential systems, the color difference signals from FIFO 140 are vertically interpolated by means of conventional interpolating filters 142 to generate reconstructed R−Y and B−Y signals, and then reconverted to analog signals by respective D/A converters 144 and 146, both clocked at a rate of $2F_s/15$. The resulting analog signals are low-pass filtered by respective filters 148 and 150 to 2.1 MHz.

Returning now to the processing of the luminance signal, to compensate for the delays inherent in the vertical interpolation of the color difference signals, the time expanded luminance signal from FIFO 138 is suitably delayed by a delay device 152 before being reconverted to analog form by a D/A converter 154 clocked at a rate of $2F_s/5$. The resulting analog signal is filtered to 6.4 MHz by low-pass filter 156. Thus, a 525-line, 2:1 interlaced, 4:3 aspect ratio, component signal consisting of 6.4 MHz of Y and 2.1 MHz of R−Y and B−Y are available at the output of the video processor for application to a display (shown in FIG. 3).

The processing of the video signals in the 1050-line and 525-line receivers having been described, the details of the formats of the transmitted TMC signals for the two channels will now be discussed. As noted previously, DBS Channels 1 and 2 each carry time multiplexed analog component television signals frequency modulated on a respective RF carrier. Audio, data, picture sync and sundry control signals are time multiplexed with the video. Consequently, only one component signal exists at a time on each carrier, thereby avoiding intermodulation distortions. The signals on Channels 1 and 2 are time related in that data headers and sync signals are time coincident in order to synchronize the video line periods in the HDTV receiver. The two channels traverse identical up-and-down-link paths to and from the satellite so that time differences, if any, between the arrival of the signals from the two channels should not interfere with synchronization in the HDTV receiver.

In the discussion to follow, all clocks will be considered as synchronized to multiples of the 3.58 MHz NTSC color subcarrier frequency, $F_{sc}$, as follows:

$$F_M = 24F_{sc} = 85.92 \text{ MHz}$$

$$F_s = 12F_{sc} = 42.96 \text{ MHz}$$

$$F_d = 6F_{sc} = 21.48 \text{ MHz}$$

The line, field, and subcarrier frequencies, $F_h$, $F_f$ and $F_{sc}$, respectively, are those of the NTSC television system per the following equations:

$$F_h = (4.5 \times 10^6)/286 = 15734.26 \text{ Hz}$$

$$F_f = 2F_h/525 = 59.94 \text{ Hz}$$

$$F_{sc} = 455/2F_h = 3.579545 \text{ MHz}$$

The use of these values facilitates the interface with existing NTSC television receivers, especially those having comb filters.

Figure 11:
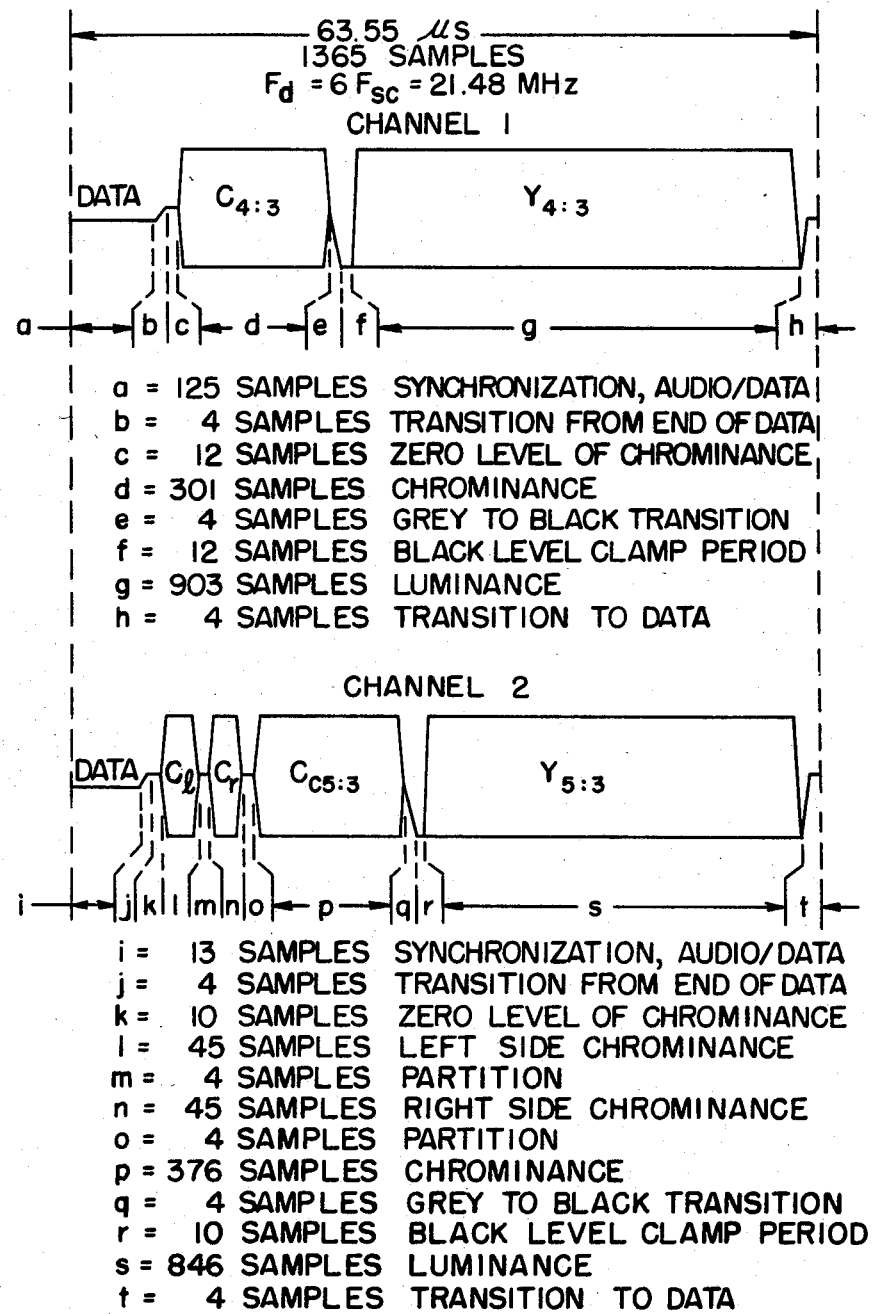
FIG. 11 is a pair of diagrams illustrating the time multiplex component (TMC) formats of the two broadcast channels of the system.

Referring now to FIG. 11, the upper portion illustrates the TMC format in transmission Channel 1 and the lower portion shows the TMC format in Channel 2. One line period, $1/F_h = 63.55$ microseconds, contains 1365 samples at the data clock frequency, $F_d$, which, as shown, is equal to $6 F_{sc} = 21.48$ MHz. In Channel 1, the luminance video, $Y_{4:3}$, occupies 903 samples, and the color difference video, $C_{4:3}$, occupies 301 samples, exactly ⅓ the number of samples for the luminance. Thus, the luminance video occupies 42.04 microseconds and the color difference video occupies 14.01 microseconds of the 63.55 microseconds line period. Synchronization and audio-data takes up 125 samples which occupy approximately 5.8 microseconds. The balance of the samples, thirty-six in number, are for partitioning and clamping periods; the number set aside for each is set forth in FIG. 11.

In the augmentation Channel 2, the luminance video, $Y_{5:3}$, occupies 846 samples; thus, compared to the luminance in Channel 1, the luminance, $Y_{5:3}$ in Channel 2 carries 5/4 of the picture with 94% of the samples. As a consequence, the baseband width of the luminance video, $Y_{5:3}$, is 75% of the bandwidth of the $Y_{4:3}$ video signal. The color difference video, $C_{c5:3}$, occupies 376 samples and thus has the same video bandwidth as the color difference video of Channel 1. The extra color information for the left and right panels of the HDTV picture is carried in $C_{l5:3}$ and $C_{r5:3}$, each of which occupies 45 samples. Synchronization and data uses 13 samples. The remaining balance of 40 samples are used for partitioning and clamping periods, the number used for each being set forth below the diagram for Channel 2. No time is allocated for audio during active lines; however, Channel 2, just like Channel 1, has the vertical blanking interval available for audio and may be used, if necessary, should the 5.8 microseconds per television line of the Channel 1 signal be inadequate.

Figure 9:
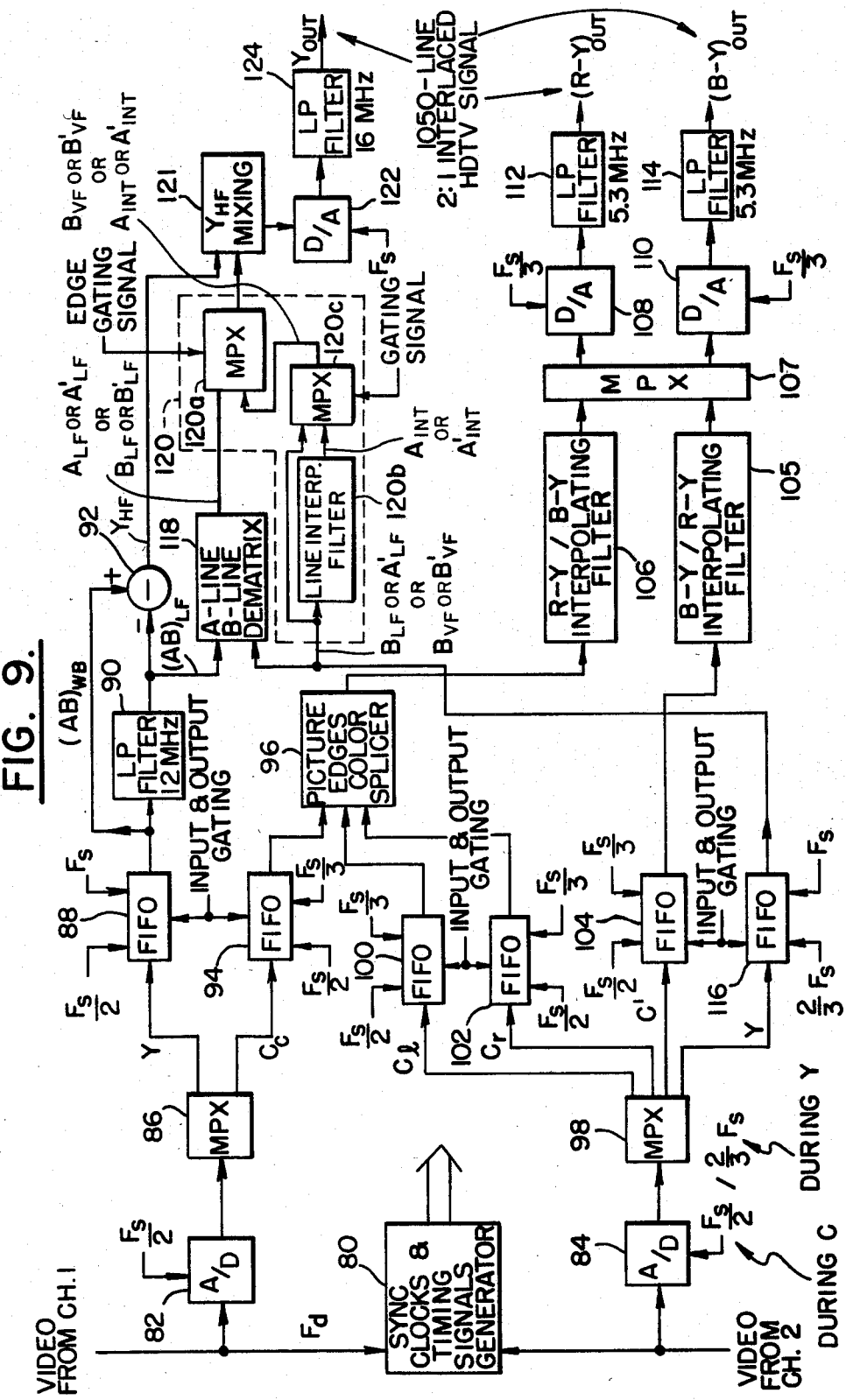
FIG. 9 is a block diagram of the video processor of the HDTV receiver of the system.

FIG. 12 graphically displays the relationships between the durations of the originating video signals, the time multiplexed component signals, the 525-line video signal, and the 1050-line video signal in Channels 1 and 2, thus, in effect, displaying the video signal processing performed by the encoder of FIG. 8, the HDTV receiver of FIG. 9, and the 525-line receiver of FIG. 10. First considering Channel 1, it will be recalled from the discussion of FIG. 7 that the active portion of the 4:3 aspect line AB has a duration of 21.02 microseconds at a maximum frequency of 16 MHz and digitized into 903 samples at a rate of $F_s = 12F_{sc}$. The 4:3 aspect ratio color difference video likewise occurs on an active line portion having a duration of 21.02 microseconds and has a maximum frequency of 5.3 MHz. This signal is initially digitized into 301 samples at a sampling rate of $4 F_{sc}$. In order that the color difference video and the luminance video in the TMC signal have the same frequency, the $Y_{4:3}$ luminance is time expanded by a factor of 2, thus reducing its frequency from 16 MHz to 8 MHz, and the $C_{4:3}$ signal is time compressed by a factor of 2/3 to 14.01 microseconds (⅓ that of $Y_{4:3}$) with an attendant increase in frequency from 5:3 MHz to 8 MHz.

At the 525-line receiver the $Y_{4:3}$ video is time expanded by a factor of 5/4 to 52.55 microseconds, the active period of a line of a conventional 525-line receiver. The color difference signal $C_{4:3}$ is also time expanded by a factor of 15/4 to equal the 52.55 microseconds active line period of the 525-line receiver. At the 1050-line receiver, for 4/5 of the active line period, that is, 21.02 microseconds, the $Y_{4:3}$ TMC signal is time compressed by a factor of two and the $C_{4:3}$ signal is time expanded by a factor 3/2 which, in turn, increases the frequency of the luminance and chrominance components to 16 MHz and 5.3 MHz, respectively, corresponding to the originating signals.

The TMC timing for Channel 2 differs in that the active portion of the 5:3 aspect ratio area line is 26.28 microseconds, instead of 21.02 microseconds, with the consequence that when sampled at $12F_{sc}$ and $4F_{sc}$, respectively, they are divided into a larger number of samples than the 4:3 aspect ratio signals. In order that both the $Y_{5:3}$ and $C_{c5:3}$ signals have the same frequency when time multiplexed, the luminance component is low-pass filtered to 12 MHz and it is time expanded and the color difference signal is time compressed with the indicated factors to cause both to have a maximum baseband frequency of 8 MHz. In the TMC signal, each of the $C_l$ and $C_r$ color signals for the left and right panels of the picture comprises 45 samples occupying a time slot of 2.1 microseconds. At the 1050-line receiver, the $Y_{5.3}$ signal is time compressed from 39.43 microseconds to the desired 26.28 microseconds, and the color difference signal, as well as the $C_l$ and $C_r$ supplementary color signals, are all time expanded by the proper factors to restore their 5.3 MHz frequency to occupy the active portion of the 1050-line period.

For the DBS application of the system, in which the TMC signal frequency modulates an RF carrier in the frequency range of 12.2 to 12.7 GHz, the front end of the HDTV receiver is configured as shown in FIG. 13. An antenna 178 with a reflector diameter of about one meter is pointed toward the desired orbital slot. A low noise amplifier and converter 180, powered through a lead-in cable 182, is fastened directly on the antenna, this assembly being adapted to accept the entire 12.2-12.7 GHz DBS band. A first intermediate frequency of about 1.5 GHz is carried into the home on the low-loss coaxial cable 182. At the HDTV receiver the first IF signal splits into separate Channel 1 and Channel 2 paths 186 and 188, respectively, for application to respective second converters 190 and 192 which are connected to receive a signal from respective local oscillators 194 and 196 which are tuneable and serve as channel selectors. The frequencies of the local oscillators are such that the second converters each produce a second intermediate frequency of about 70 MHz, which are amplified by respective amplifiers 198 and 200, limited by respective conventional limiters 202 and 204, and detected in respective conventional FM discriminators 206 and 208. The outputs of the discriminators are applied to respective gain control amplifiers 210 and 212, the outputs from which comprise the Channel 1 video and Channel 2 video, respectively, both in TMC format, which are then processed by the video processor illustrated in FIG. 9 to derive the 1050-line, 2:1 interlaced, HDTV signal.

An audio-data demodulator 214 connected to receive the amplified second intermediate frequency signal from amplifier 198 in Channel 1 provides the audio-data, sync, as well as a number of sundry control signals carried by the Channel 1 signal. The audio-data, which may include three or more sound channels and subscriber code information, is suitably processed for reproduction of the sound signals. The control signals include a color killer signal which is applied to the display circuitry of the receiver during monochrome programs, a 525/1050 switchover signal which is applied to the receiver to enable it for processing the signals from one channel to obtain a 525-line picture or two channels to obtain the HDTV picture, a Channel 2 frequency selector signal which is coupled to and controls the local oscillator 196 for Channel 2 in the event of HDTV broadcasts, and a signal representing frequency deviation figure. The latter signal is applied to a video gain control circuit 216 which controls gain control amplifiers 210 and 212 to set the video levels in the two channels to take into account the fact that frequency deviations may vary from one broadcaster to the next and thereby causing the signal amplitude to vary. For example, standard quality 525-line broadcasts may use more or less deviation than will enhance 525-line or 1050-line HDTV. The sync signal is applied to a circuit 218 in which it is time-matched with a sync signal provided by a data demodulator 220 connected to receive the second intermediate frequency Channel 2 signal. The time matched synchronization signals are applied over a line 222 to the timing signal generator 80 of the video processor of the HDTV receiver, and also to a video time control device 224 in the Channel 2 path for adjusting the Channel 2 video signal, if necessary, to be time-coincident with the Channel 1 video signal.

Figure 14:
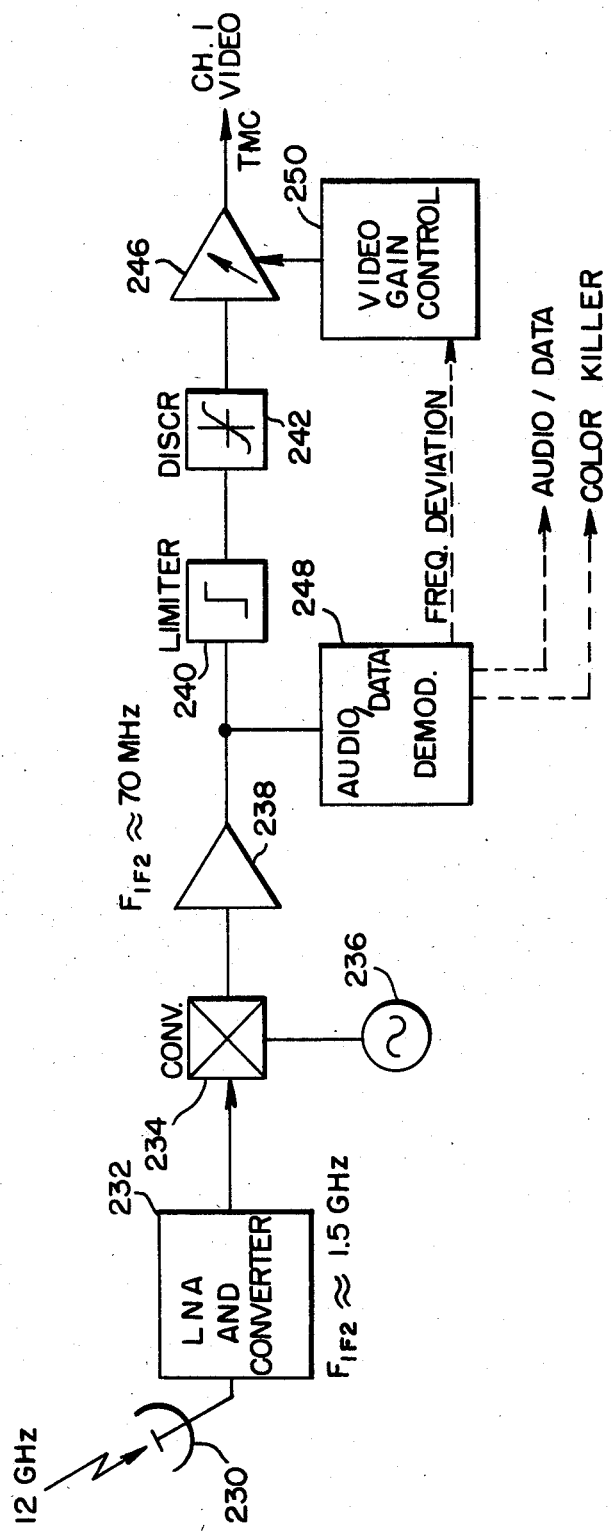
FIG. 14 is a block diagram of the front end of the 525-line receiver.

FIG. 14 is a block diagram of the front end of a receiver having the video processor shown in FIG. 10 for receiving a Channel 1 broadcast for a 525-line, 4:3 aspect ratio display. An antenna 230 with a reflector diameter of about one meter is directed toward the desired orbital slot for reception of the frequency modulated carrier signal having a frequency in the range of 12.2 to 12.7 GHz. A low noise amplifier and converter 232 is fastened directly on the antenna and produces a first intermediate frequency of about 1.5 GHz which is carried into the home on a low-loss coaxial cable to the 525-line receiver where it is applied to a second converter 234 connected to receive a local oscillator signal from oscillator 236. The second converter 234 produces a second intermediate frequency signal of about 70 MHz which is amplified in an amplifier 238, limited by a limiter 240 and detected in an FM discriminator 242. The output of the discriminator is amplified in a variable gain amplifier 246 and the resulting TMC video signal is then processed to a baseband Y, R−Y, B−Y component video signal by the video processor shown in FIG. 10 for application directly to a monitor display or for NTSC composite color encoding for application to an NTSC television set.

An audio demodulator 248, connected to receive the second intermediate frequency signal, provides the audio-data, sync and a color killer signal for application to the monitor display. Also provided is a control signal, indicative of frequency deviation, which is applied to a video gain control circuit 250 which controls gain control amplifier 246 to set the level of the video.

The improved HDTV system having been described, its performance will now be compared with other television systems. While television video performance can be specified objectively in terms of image responses (spatial and temporal) and visible artifacts (noise, aliasing, and other impairments) which will be briefly discussed later, a method that is especially helpful in weighing cost-benefit ratios is to describe performance relative to other television systems, e.g., NTSC or enhanced NTSC, which will now be done with reference to FIG. 15.

Vertical resolution can be expressed as a spatial frequency, $f_y$, where $$f_y = (N_a/2)K,$$

and $N_a$ = number of active scan lines $K$ = Kell factor = 0.7

Due to the image being sampled along the vertical axis by the scanning lines, $N_a/2$ represents the Nyquist limit of $f_y$. Ideally, $f_y$ should be vertically filtered to have no response above $N_a/2$ in order to avoid alias distortions.

For purposes of the resolution comparisons to follow, horizontal resolution is expressed as the spatial frequency, $f_x$, and represents the maximum number of cycles per picture width (c/pw) that can be resolved in the reproduced image. In order to relate the horizontal to the vertical spatial frequencies, it is convenient to express the horizontal resolution in terms of vertical resolution elements, as follows:

$$f'_x = f_x/\text{aspect ratio}$$

where $f'_x$ is the normalized horizontal resolution in cycles per picture height, c/ph. Resolutions are normally expressed as television lines per picture height, there being two lines per spatial frequency cycle.

Considering first the resolution of the present two channel system, as fully described above, the 1050-line HDTV picture occupies a 5:3 aspect ratio raster consisting of a center 4:3 aspect area and two side areas (0.5:3). Since the center area of the image exhibits higher horizontal and vertical resolutions than do the side areas, each area will be described separately, with reference to display (C) of FIG. 15, starting with the center area luminance resolution. The center area contains approximately 970 active scan lines resulting in a luminance vertical resolution of:

$$f_y = 970/2)0.7 = 340 \text{ c/ph} = 680 \text{ television lines}$$

Horizontal resolution calculations are more complicated because of the contributions from both Channels 1 and 2 and the different luminance video bandwidths of the two channels; the luminance video bandwidth of Channel 1 is 16 MHz and of Channel 2 is 12 MHz. Line A of odd fields and lines B' of even fields are linearly matrixed from Channels 1 and 2, the resultant video spectrum being 0 to 12 MHz uncombed and 12 to 16 MHz comb filtered. Line B of odd fields and lines A' of even fields are contributed solely by Channel 2 over the video spectrum 0 to 12 MHz; to these are added the 12 to 16 MHz combed spectral signal previously mentioned to make the total spectrum. The luminance horizontal resolution of the 4:3 aspect center area is:

$$f'_x = (t_{active} \times 16 \text{ MHz})/\text{aspect ratio} = 252c/ph = 504 \text{ lines,}$$

where $t_{active} = 21.02$ microseconds and aspect ratio $= 4:3$. The combed horizontal video frequencies 12 to 16 MHz causes a reduction in resolution on the diagonal axes of the image.

As for side area luminance resolution, despite the fact that the side areas of the raster of the receiver are being scanned with 1050 lines, the vertical resolution is halved because all video in the side areas is contributed only by Channel 2, which contains 525 lines per frame, or 485 active scan lines. The vertical resolution then is:

$$f_y = (N_a/2)K = (485/2)0.7 = 170c/ph = 340 \text{ lines}$$

Luminance normalized horizontal resolution $f'_x$ of each 0.5:3 aspect ratio side area is:

$$f'_x = (t_{active} \times 12 \text{ MHz})/\text{aspect ratio}$$
$$= (2.63 \text{ microseconds} \times 12 \text{ MHz})/0.167$$
$$= 189 \text{ c/ph} = 378 \text{ lines}$$

Considering now the center area chrominance resolution, the fact that line alternate color-difference signals are used causes the vertical spatial frequency of the chrominance image to be half that of the luminance; i.e., $$f_y = (970/4)0.7 = 170c/ph = 340 \text{ lines.}$$

The horizontal normalized resolution of the center area's chrominance image is:

$$f'_x = (t_{active} \times 5.33 \text{ MHz})/\text{aspect ratio} = 84c/ph = 168 \text{ lines.}$$

As for the chrominance resolution of the side areas, it will be recalled that the side areas receive no chrominance information from Channel 1 with the consequence that it all must come from Channel 2 via the $C_c$, $C_l$, $C_r$ transmissions. The vertical spatial frequency is the same as that of the center area, namely, 170c/ph, or 340 lines. The normalized horizontal chrominance resolution of each side area is:

$$f'_x = (t_{active} \times 5.33 \text{ MHz})/\text{aspect ratio}$$
$$= (2.62 \text{ microseconds} \times 5.33 \text{ MHz})0.167$$
$$= 84 \text{ c/ph} = 168 \text{ lines}$$

The luminance and chrominance resolutions of the 525-line signal transmitted via Channel 1 is illustrated in display (B) of FIG. 15 labeled "Enhanced NTSC". The 525-line, 4:3 aspect ratio, TMC video signal carried by Channel 1 is capable of producing excellent pictures, somewhat better than that of an NTSC picture, but not as good as the center 4:3 area of the 1050-line picture shown in display(C). Luminance vertical spatial resolution with 485 active scan lines is:

$$F_y = (485/2)0.7 = 170c/ph = 340 \text{ lines,}$$

and luminance normalized horizontal resolution is:

$$f'_x = (t_{active} \times 6.4 \text{ MHz})/\text{aspect ratio} = 252c/ph = 504 \text{ lines.}$$

The chrominance being transmitted in line sequential form, the vertical spatial frequency is 170/2=85c/ph or 170 lines, and chrominance normalized horizontal resolution is:

$$f'_x = (t_{active} \times 2.13 \text{ MHz})/\text{aspect ratio}$$
$$= 84 \text{ c/ph} = 168 \text{ lines.}$$

The resolutions of the center 4:3 aspect area of the 1050-line picture (display(C)) will now be compared with an NTSC picture (display(A)) produced by a receiver containing modern components such as a comb filter and a high resolution kinescope. The luminance video signal of the NTSC picture extends to 4.2 MHz with combing from 2.8 to 4.2 MHz. A full bandwidth I,Q decoder having an average chrominance bandwidth of 1.2 MHz (average of 1.7 MHz and 0.6 MHz Q bandwidths) is employed.

The vertical resolution of the NTSC luminance picture is:

$$f_y = (N_a/2)K$$
$$= (485/2)0.7 = 170 \text{ c/ph} = 340 \text{ lines}$$

Normalized horizontal luminance resolution is:

$$f_x = (t_{active} \times 4.2 \text{ MHz})/\text{aspect ratio}$$

$$= 166 \, c/ph = 332 \text{ lines}$$

The resolutions on the diagonal axes will be reduced by the combing of the video signal from 2.8 to 4.2 MHz; the comb filter also causes the vertical resolution of the chrominance picture to be halved to $f_y = 85 c/ph$, or 170 lines. The normalized horizontal resolution of the chrominance picture is:

$$f_x = (t_{active} \times 1.2 \text{ MHz})/\text{aspect ratio}$$

$$= 47 \, c/ph = 94 \text{ lines}$$

Although the invention has been described as applied to an HDTV system in which compatible 525-line picture signals are broadcast on one of two channels, the concept is useful in and can be readily applied to any interlaced standard system, such as the 625-line, 50 fields/sec., 2:1 interlace system, in which case the source signal would be a 1250-line, 50 fields/sec., 5:3 aspect ratio, signal, and 625 lines would be transmitted in each of two channels. Also, although specific implementations of video processors for the encoder and decoders have been described, it will be apparent to ones skilled in the art that such is by way of illustration only and changes can be made without departing from the spirit of the invention. Further, although the major immediate use of systems incorporating the principles of this invention is the field of direct broadcast from satellite, they can be used in other environments; for example, the Channel 1 and 2 signals can be transmitted at baseband frequencies over cable systems. Therefore, it is understood that the invention is to be limited solely to the scope of the appended claims.

We claim:

1. A system compatible with an N-line television system suitable for direct broadcast satellite transmission of high definition television signals, said system comprising:
   a source of 2N-line, 5:3 aspect ratio, television signal,
   first means for deriving from said source signal and transmitting through a first channel N-line, 4:3 aspect ratio television picture signals,
   second means for deriving from said source signal and transmitting through a second channel simultaneously with the transmission of signals in said first channel N-line, 5:3 aspect ratio television picture signals, and
   at least a first receiver including means for simultaneously receiving television picture signals transmitted through said first and second channels and means for combining the received signals and producing 2N-line, 5:3 aspect ratio, high definition television pictures.

2. A system according to claim 1, wherein said system further comprises a second receiver including means for receiving the signal transmitted through said first channel and producing N-line, 4:3 aspect ratio, television pictures.

3. A system according to claim 2, wherein said 2N-line source signal comprises successive even-field lines A' and B' interlace with successive odd-field lines A, B and B, A, respectively, and
   wherein said first means includes means for combining during odd fields predetermined amplitude portions of the central 4:3 width of successive odd-field lines A and B of said source signal to produce line pairs AB and for combining during even fields a predetermined amplitude portion of the central 4:3 width of successive even-field lines A' and B' of said source signal to produce line pairs A'B' in alternation with said line pairs AB.

4. A system according to claim 3, wherein the combining means of said first means is operative to combine successive odd-field lines in the amplitude proportions $\frac{3}{4}$A and $\frac{1}{4}$B and to combine successive even-field lines in the amplitude proportions $\frac{1}{4}$A' and $\frac{3}{4}$B'.

5. A system according to claim 4, wherein said second means includes means for deriving during odd fields from said source signal for transmission through said second channel the central 4:3 width of odd-field lines B and during even fields the central 4:3 width of even-field lines A' and adding at the sides of each successive B line a signal $B_{VF}$ obtained by vertically filtering successive odd-field lines B and adding at the sides of each successive A' line a signal $B'_{VF}$ obtained by vertically filtering successive even-field lines B', each added combination being of sufficient duration to extend said B and A' lines to 5:3 width.

6. A system according to claim 5, wherein the combining means in said first receiver includes means for combining the central 4:3 width of the lines derived from said source signal in the amplitude proportions $$\text{odd-field } A \text{ lines} = 4/3(\tfrac{3}{4}A + \tfrac{1}{4}B) - \tfrac{1}{3}B$$

$$\text{odd-field } B \text{ lines} = B$$

$$\text{even-field } A' \text{ lines} = A'$$

$$\text{even-field } B' \text{ lines} = 4/3(\tfrac{3}{4}A' + \tfrac{1}{4}B') - \tfrac{1}{3}A'$$

means for adding at the sides of the resulting odd-field lines B a signal $B_{VF}$ obtained by vertical filtering successive odd-field lines B and for adding at the sides of the resulting even-field lines B' a signal $B'_{VF}$ obtained by vertically filtering successive even-field lines B', and
   means for adding at the sides of the resulting odd-field lines A a signal $A_{INT}$ obtained by interpolating adjacent $B_{VF}$ odd-field lines and for adding at the sides of the resulting even-field lines A' a signal $A'_{INT}$ obtained by interpolating adjacent $B'_{VF}$ even-field lines.

7. A system according to claim 6, wherein N is equal to 525, and said source signal is a component television signal.

8. A system according to claim 3, wherein N is equal to 525.

9. A high definition television system comprising:
   a source of a 1050-line, 60 fields per second (nominal) 2:1 interlace, 5:3 aspect ratio, component television signal,
   first means coupled to said source for deriving from said source signal and transmitting through a first channel a video signal consisting of 525 lines of a width representing only the central 4:3 aspect ratio area of the television picture represented by said source signal,
   second means coupled to said source for deriving from said source signal and transmitting through a second channel an augmentation video signal consisting of another 525 lines with 5:3 aspect ratio, and at least a first receiver including means for receiving and combining the video signals transmitted through said first and second channels to produce a 1050-line, 5:3 aspect ratio, high definition television picture.

10. A television system according to claim 9, wherein said system further comprises:
a second receiver including means for receiving the video signal transmitted through said first channel and producing a 525-line, 4:3 aspect ratio, television picture.

11. A television system according to claim 10, wherein the means in said second receiver includes
means for separating the video signal transmitted through said first channel into its luminance component, Y, and its color difference components, R−Y and B−Y,
filter means for interpolating said color difference components and producing simultaneous and separate, filtered R−Y and B−Y output signals, and
means for processing said luminance component and producing a separate luminance output signal.

12. A television system according to claim 9, wherein said 1050-line source signal comprises successive even-field lines A' and B' interlaced with successive odd-field lines A, B and B, A, respectively, and
wherein said first means includes means for combining during odd fields predetermined amplitude portions of the central 4:3 width of successive odd-field lines A and B of said source signal to produce line pairs AB and for combining during even fields predetermined amplitude portions of the central 4:3 width of successive even-field lines A' and B' of said source signal to produce line pairs A'B' in alternation with said line pairs AB.

13. A television system according to claim 12, wherein said combining means is operative to combine successive pairs of odd-field lines with the amplitude proportions $\frac{3}{4}$A and $\frac{1}{4}$B and to combine successive pairs of even-field lines with the amplitude proportions $\frac{1}{4}$A' and $\frac{3}{4}$B'.

14. A television system according to claim 13, wherein said second means includes means for selecting during odd fields for transmission through said second channel the central 4:3 width of odd-field lines B and during even fields the central 4:3 width of even-field lines A' and adding at the sides of the successive B lines vertically filtered successive odd-field lines $B_{VF}$ and adding at the sides of successive A' lines vertically filtered successive even-field lines $B'_{VF}$, each added combination being of sufficient duration to extend said B and A' lines to 5:3 width.

15. A television system according to claim 14, wherein the combining means in said first receiver includes means for combining the central 4:3 width of the lines derived from said source signal in the amplitude proportions odd-field $A$ lines $= 4/3(\frac{3}{4}A + \frac{1}{4}B) - \frac{1}{4}B$ odd-field $B$ lines $= B$ even-field $A'$ lines $= A'$ even-field $B'$ lines $= 4/3(\frac{1}{4}A' + \frac{3}{4}B') - \frac{1}{4}A'$ means for adding at the sides of the resulting odd-field lines B a signal $B_{VF}$ obtained by vertically filtering successive odd-field lines B and for adding at the sides of the resulting even-field lines B' a signal $B'_{VF}$ obtained by vertically filtering successive even-field lines B', and
means for adding at the sides of the resulting odd-field lines A a signal $A_{INT}$ obtained by interpolating adjacent $B_{VF}$ odd-field lines and adding at the sides of the resulting even-field lines A' a signal $A'_{INT}$ obtained by interpolating adjacent B'VF even-field lines.

16. A television system according to claim 12, wherein said second means includes means for deriving during odd fields from said source signal for transmission through said second channel the central 4:3 width of odd-field lines B and during even fields the central 4:3 width of even-field lines A' and adding at the sides of the successive B lines vertically filtered successive odd-field lines $B_{VF}$ and adding at the sides of successive A' lines vertically filtered successive even-field lines $B'_{VF}$, each added combination being of sufficient duration to extend said B and A' lines to 5:3 width.

17. A television system according to claim 16, wherein the combining means in said first receiver includes means for combining the central 4:3 width of the lines derived from said source signal in the amplitude proportions odd-field $A$ lines $= 4/3(\frac{3}{4}A + \frac{1}{4}B) - \frac{1}{4}B$ odd-field $B$ lines $= B$ even-field $A'$ lines $= A'$ even-field $B'$ lines $= 4/3(\frac{1}{4}A' + \frac{3}{4}B') - \frac{1}{4}A'$ means for adding at the sides of the resulting odd-field lines B a signal $B_{VF}$ obtained by vertically filtered successive odd-field lines B and for adding at the sides of the resulting even-field lines B' a signal $B'_{VF}$ obtained by vertically filtering successive even-field lines B', and
means for adding at the sides of the resulting odd-field lines A a signal $A_{INT}$ obtained by interpolating adjacent $B_{VF}$ odd-field lines and adding at the sides of the resulting even-field lines A' a signal $A'_{INT}$ obtained by interpolating adjacent $B'_{VF}$ even-field lines.

18. A television system according to claim 12, wherein odd-field lines A and B of said 1050-line source signal contain color difference signals B−Y and R−Y,
wherein said first means includes means for time division multiplexing the central 4:3 width of line-alternate color difference signals with the luminance components of said first line pairs AB, and
wherein said second means includes means for time division multiplexing the 5:3 width of line alternate color difference signals with the luminance components of said odd-field lines A.

19. A television system according to claim 18, wherein the time division multiplexing means of said second means includes means for multiplexing into the horizontal line period of a 525-line signal, in the following order, line alternate color signals from the sides of the 4:3 width of said line pairs AB, the 5:3 width of said line-alternate color difference signals, and the luminance components of the said line pairs AB.

20. For a system suitable for direct broadcast satellite (DBS) transmission of television signals to one or more receivers, apparatus for producing first and second channel signals which when combined produce wide screen, high definition television pictures, said signal producing apparatus comprising:
- a source of 1050-line, 2:1 interlaced, 5:3 aspect ratio, component television signals,
- first means coupled to said source for deriving from the source signal for application to said first channel a first video signal consisting of 525 lines representing only the central 4:3 aspect ratio area of the television picture represented by said source signal, and
- second means coupled to said source for deriving from the source signal for application to said second channel an augmentation video signal consisting of another 525 lines with 5:3 aspect ratio.

21. Apparatus according to claim 20, wherein said 1050-line source signal comprises a set of 262½ successive pairs of even-field lines A' and B' interlaced with 262½ successive pairs of odd-field lines A, B and B, A, respectively,
- wherein said first means includes combining means for combining during odd fields predetermined amplitude portions of the central 4:3 width of successive odd-field lines A and B of said source signal to produce line pairs AB and for combining during even fields predetermined amplitude portions of the central 4:3 width of successive even-field lines A' and B' of said source signal to produce line pairs A'B' in alternation with said line pairs AB, and
- wherein said second means includes means for deriving the central 4:3 width of odd-field lines B in alternation with the central 4:3 width of even-field lines A' and adding at the sides of the resulting successive B lines a signal $B_{VF}$ obtained by vertically filtering successive odd-field lines B and adding at the sides of the resulting successive A' lines a signal $B'_{VF}$ obtained by vertically filtering successive even-field lines B', each added combination having sufficient duration to extend said B and A' lines to 5:3 width.

22. Apparatus according to claim 21, wherein said combining means is operative to combine successive odd-field lines in the amplitude proportions $\tfrac{3}{4}A$ and $\tfrac{1}{4}B$ and to combine successive even-field lines in the amplitude proportions $\tfrac{1}{4}A'$ and $\tfrac{3}{4}B'$.

23. Apparatus according to claim 22, wherein odd-field lines A and B of said 1050-line source signal contain color difference signals B−Y and R−Y,
- wherein said first means includes means for time division multiplexing into the horizontal line period of a 525-line signal the central 4:3 width of line-alternate color difference signals and the luminance components of said line pairs AB, and
- wherein said second means includes means for time division multiplexing into the horizontal line period of a 525-line signal the 5:3 width of line-alternate color difference signals, line-alternate color difference signals from the sides of the 4:3 width of said line pairs AB, and the luminance components of odd-field lines A.

24. For use with the signal producing apparatus produced by claim 22, a first receiver adapted to receive signals transmitted by said first and second channels and comprising:
- means for recovering said first video signal and said augmentation signal,
- means for combining the central 4:3 widths of the 525 lines contained in said first video signal and in said augmentation signal in the amplitude proportions odd-field A lines $= 4/3(\tfrac{3}{4}A + \tfrac{1}{4}B) - \tfrac{1}{3}B$ odd-field B lines $= B$ even-field A' lines $= A'$ even-field B' lines $= 4/3(\tfrac{1}{4}A' + \tfrac{3}{4}B') - \tfrac{1}{3}A'$

- means for adding at the sides of the resulting 4:3 width odd-field lines B a signal $B_{VF}$ obtained by vertically filtering successive odd-field lines B and for adding at the sides of the resulting 4:3 width even-field lines B' a signal $B'_{VF}$ obtained by vertically filtering successive even-field lines B', and
- means for adding at the sides of the resulting 4:3 width odd-field lines A a signal $A_{INT}$ obtained by interpolating adjacent $B_{VF}$ odd-field lines and for adding at the sides of the resulting 4:3 width even-field lines A' a signal $A'_{INT}$ obtained by interpolating adjacent $B'_{VF}$ even-field lines.

25. Apparatus according to claim 21, wherein odd-field lines A and B of said 1050-line source signal contain color difference signals B−Y and R−Y,
- wherein said first means includes means for time division multiplexing the central 4:3 width of line-alternate color difference signals with the luminance components of said line pairs AB, and
- wherein said second means includes means for time division multiplexing the 5:3 width of line-alternate color difference signals, line-alternate color difference signals from the sides of the 4:3 width of said line pairs AB, and the luminance components of odd-field lines A.

26. For use with the signal producing apparatus defined by claim 20, a first receiver adapted to receive signals transmitted by said first and second channels and comprising:
- means for recovering said first video signal and said augmentation video signal; and
- means for combining said first video signal and said augmentation signal and producing 1050-line, 5:3 aspect ratio, high definition television pictures.

27. A television transmission system compatible with a television system having N television lines and a standard aspect ratio picture format, said system comprising:
- a source of television picture signal having 2N television lines and a wider than standard aspect ratio picture format and the same height as said standard picture format,
- first means for deriving from said source for transmission through a first transmission channel a first television signal having N lines and said standard aspect ratio, and
- second means for deriving from said source for transmission through a second transmission channel simultaneously with the transmission of said first signal a second television signal having N lines and said wider than standard aspect ratio and containing information which when combined with that of said first television signal produces a high definition display having 2N lines and said wider than standard aspect ratio picture format.

28. A television transmission system as defined in claim 27, wherein said 2N-line source signal comprises successive even-field lines A' and B' interlaced with successive odd-field lines A, B and B, A, respectively, and wherein said first means includes means for combining during odd fields predetermined amplitude portions of a central portion of successive odd-field lines A and B of said source signal having the width of said standard aspect ratio picture format to produce line pairs AB, and for combining during even fields a predetermined amplitude portion of a central portion of successive even-field lines A' and B' of said source signal having the width of said standard aspect ratio picture format to produce line pairs A'B' in alternation with said line pairs AB.

29. A television transmission system as defined in claim 28, wherein the combining means of said first means is operative to combine successive odd-field lines in the amplitude proportions $\frac{3}{4}$A and $\frac{1}{4}$B and to combine successive even-field lines in the amplitude proportions $\frac{1}{4}$A' and $\frac{3}{4}$B'.

30. A television transmission system as defined in claim 29, wherein said second means includes means for deriving from said source signal during odd fields thereof for transmission through said second channel a central portion of odd-field lines B having the width of a standard picture format and during even fields a central portion of the same width of even-field lines A' and adding at the sides of each successive B line a signal $B_{VF}$ obtained by vertically filtering successive odd-field lines B and adding at the sides of each successive A' line a signal $B'_{VF}$ obtained by vertically filtering successive even-field lines B', each added combination being of sufficient duration to extend said B and A' lines to the width of said wider than standard picture format.

31. A television transmission system for the simultaneous transmission from the same scene for standard and wide picture formats respectively having N lines and a standard aspect ratio and 2N lines and a wider than standard aspect ratio, with both picture formats having the same height, in which a first television signal derived from signal information relating to the scene having 2N lines and said wider than standard aspect ratio and containing information for the production of a display with the standard picture format is transmitted by way of a first transmission path, and a second television signal derived from said signal information relating to the scene having said wider than standard aspect ratio and containing the additional information required to be added to that of said first television signal for the production of a high definition display having 2N lines and said wide picture format is transmitted by way of a second transmission path.

32. A television transmission system for the simultaneous transmission from the same scene for standard and wide picture formats respectively having N lines and a standard aspect ratio and 2N lines and a wider than standard aspect ratio with both picture formats having the same height, said system comprising:

a source of signal information relating to the scene having 2N lines and said wider than standard aspect ratio, first means for deriving from said source for transmission through a first transmission path a first television signal having N lines and said standard aspect ratio, second means for deriving from said source for transmission through a second transmission path a second television signal having N lines and said wider than standard aspect ratio and containing information which when combined with that of said first television signal produces a high definition display having 2N lines and said wide picture format.

33. Television reception apparatus for use with the television transmission system as defined in claim 32 comprising:

a first input terminal for receiving said first television signal present in said first transmission path, a second input terminal for receiving said second television signal present in said second transmission path, and means for combining the video information contained in said first and second television signals for producing a 2N-line wide picture format display representing the full width of the scene from which said first and second television signals are derived.

* * * * *